US008045429B2

(12) United States Patent

Kitao et al.

(10) Patent No.: US 8,045,429 B2

(45) Date of Patent: Oct. 25, 2011

(54) CONTROL APPARATUS AND METHOD FOR CONTENT REPRODUCING

(75) Inventors: Hideki Kitao, Kobe (JP); Takao Iwasaki, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 286 days.

(21) Appl. No.: 12/461,003

(22) Filed: Jul. 29, 2009

(65) Prior Publication Data

US 2010/0027391 A1 Feb. 4, 2010

(30) Foreign Application Priority Data

Jul. 29, 2008 (JP) ................................ 2008-194866
Jul. 29, 2008 (JP) ................................ 2008-194867

(51) Int. Cl.
*G11B 7/00* (2006.01)

(52) U.S. Cl. ..................................................... 369/47.1

(58) Field of Classification Search ................. 369/47.1, 369/47.27, 53.22, 47.36; 386/123, 125, 126, 386/256; 348/419; 345/279
See application file for complete search history.

(56) References Cited

U.S. PATENT DOCUMENTS 7,623,769 B2 * 11/2009 Ikeda et al. .................. 386/248

FOREIGN PATENT DOCUMENTS

EP 1 675 119 A1 6/2006
JP A-2008-507795 3/2008
WO WO 2005/036547 A1 4/2005
WO WO 2006/009305 A1 1/2006

* cited by examiner

*Primary Examiner* — Nabil Z Hindi

(74) *Attorney, Agent, or Firm* — Oliff & Berridge, PLC

(57) ABSTRACT

In a content reproducing system (1), which includes: a program judging unit (31) that judges whether or not a BD-J program being executed is a continuing program when an eject operation for a BD is detected during reproduction control in which reproduction of a content is controlled by execution of the BD-J program; and a reproduction control management unit (21) that causes the reproduction control performed by the BD-J program to be stopped if the BD-J program is not the continuing program and performs switching to the reproduction control for the content based on any one of media excluding the BD (41), the reproduction control based on execution of the continuing program is continued if the BD-J program is the continuing program.

6 Claims, 11 Drawing Sheets

SCREEN TRANSITION:

OPERATION : EXECUTE BD-J PROGRAM → REPRODUCE DIGITAL TV
CONTINUOUSLY EXECUTE BD-J PROGRAM

SOUND : SOUND FROM BD-J PROGRAM → SOUND FROM DTV
+ SOUND FROM BD-J PROGRAM

SCREEN TRANSITION:

OPERATION : EXECUTE BD-J PROGRAM → REPRODUCE DIGITAL TV
CONTINUOUSLY EXECUTE BD-J PROGRAM

SOUND : SOUND FROM BD-J PROGRAM → SOUND FROM DTV
+ SOUND FROM BD-J PROGRAM

SCREEN TRANSITION :

OPERATION : EXECUTE BD-J PROGRAM ⟶ REPRODUCE FM RADIO
CONTINUOUSLY EXECUTE BD-J PROGRAM

SOUND :   (NONE)   ⟶   SOUND FROM FM RADIO

SCREEN TRANSITION :

OPERATION : EXECUTE BD-J PROGRAM ⟶ DISPLAY NAVIGATION
CONTINUOUSLY EXECUTE BD-J PROGRAM

SOUND : SOUND FROM BD-J PROGRAM ⟶ SOUND FROM BD-J PROGRAM

CONTROL APPARATUS AND METHOD FOR CONTENT REPRODUCING

CROSS-REFERENCE TO RELATED APPLICATION

This application is based upon and claims the benefit of priority of the prior Japanese Patent Applications No. 2008-194866, filed on Jul. 29, 2008, and No. 2008-194867, filed on Jul. 29, 2008, the entire contents of which are incorporated herein by reference.

FIELD

The present invention relates to a content reproducing system that performs reproduction of a content including at least one of a picture and an audio based on data acquired from at least one of a plurality of kinds of medium.

BACKGROUND

Up to now, there is known a technology for a reproduction apparatus on which information recorded on an optical disc and information recorded on a hard disc or the like are combined as package information to be subjected to reproduction or execution, in which if an application that is viable across a plurality of discs is running when titles are switched over, an update of the information recorded on the hard disc is recognized as the same as an operation of replacing discs to thereby cause the application to continue running without being forcefully terminated even if switchover between the titles occurs (see Patent document 1).

In addition, there is known a reproduction apparatus in which when an instance exists in a work memory of a Java virtual machine, reproduction of a title is interpreted as continuing even if an application is terminated, and if a reproduction end event is issued, the reproduction of the title is assumed to be ended, which is followed by a selection of the next title (see Patent document 2).

[Patent document 1] JP 2008-507795 A

[Patent document 2] WO 2005/036547

SUMMARY

Conventionally, there is known a technique for managing each reproduction function based on a mode switching operation with the reproduction function for each medium being handled as a mode, on an apparatus provided with a function of reproducing a picture and an audio based on data acquired through a recording medium such as a compact disc (CD) or a digital versatile disc (DVD) or a medium such as a broadcast wave. Specifically, in conjunction with an operation of ejecting a disc or the like serving as the recording medium, such a mode management is performed as to automatically perform switchover from a reproduction mode for the disc to a preset mode or a mode (so-called last mode) which has been executed immediately before disc reproduction. In particular, an on-vehicle content reproducing apparatus often uses such a mode management technique, and such a mode management technique allows a user to instantaneously start audio-visual enjoying of the picture and the audio reproduced regarding television broadcast, radio broadcast, navigation, or other such function only by performing the operation of ejecting the disc being audiovisually enjoyed.

Here, a Blu-ray Disc (registered trademark, hereinafter, referred to as "BD") may use, as a scheme for reproduction control for the picture and the audio based on recorded data, not only a high definition movie (HDMV) control scheme developed by extending a scheme used for the conventional DVD but also a Blu-ray Disc Java (registered trademark) (BD-J) control scheme for performing control of a reproduction content by executing a Java (registered trademark) program. A BD-J title controlled with the use of such a Java program allows contents of the content to be made more interactive and expression of the content according to the user's operation to be made more diverse compared with the conventional DVD or the like. In addition, unlike the conventional CD, DVD, or the like, some of such BD-J titles are intended to continue execution of the Java program even if the disc itself is taken out from the reproduction apparatus, for the purposes of continuously providing the content based on the program or waiting for insertion of the subsequent disc.

Therefore, with the conventional technique for managing each reproduction function based on the mode switching operation, there is a fear that the execution of the Java program to be continuously executed may be forcefully terminated and may shift to another mode. Then, in such a case, control may not be performed as expected by a producer of the content in content control for a case where the subsequent disc is loaded, in the execution of the Java program created so as to allow the content to be enjoyed even after the ejecting of the disc, or in other such occasion.

In view of the problems described above, it is an object of the present invention to provide a content reproducing system, in which a program read from a recording medium such as a BD is used to control reproduction of a picture and an audio, with a function equivalent to mode management for a conventional reproduction apparatus even if the recording medium is ejected during execution of such a program, and with a behavior in accordance with an intention of a producer of the recording medium as necessary.

In order to achieve the object described above, according to the present invention, it is judged whether or not a program being executed is to be continuously executed when an operation of ejecting a disc is detected, and the execution of the program is continued if the program is to be continuously executed, while if the program is not to be continuously executed, the execution of the program is terminated to be switched over to another mode, which makes it possible to provide a function equivalent to mode management for a conventional reproduction apparatus and a behavior in accordance with an intention of a producer of the recording medium as necessary.

Specifically, according to the present invention, there is provided a control apparatus for a content reproducing system that performs reproduction of a content based on data acquired from at least one of a plurality of kinds of medium. The control apparatus is connected to a reading device that is capable of loading and ejecting a recording medium on which a program for controlling the reproduction of the content is recorded and reads data from the loaded recording medium. The control apparatus includes: an eject operation detecting unit configured to detect that an eject operation for the recording medium from the reading device is performed during reproduction control in which the reproduction of the content is controlled by executing the program read from the recording medium by the reading device; a program judging unit configured to judge, if the eject operation is detected by the eject operation detecting unit, whether or not the program being executed is a continuing program to be continuously executed even after the ejecting of the recording medium; and a reproduction control switching unit configured to perform, if it is judged that the program is not the continuing program, switching of the reproduction control by stopping the reproduction control performed by execution of the program and by starting the reproduction control for the content based on the data acquired from any medium among the plurality of kinds of medium excluding the recording medium. If it is judged that the program is the continuing program, the reproduction control performed by execution of the continuing program is continued.

The control apparatus according to the present invention is a control apparatus for a content reproducing system that performs reproduction of a content including at least one of a picture and an audio generated based on data acquired from at least one of a plurality of kinds of medium. Here, in addition to the recording media such as a CD, a DVD, and a BD, the plurality of kinds of medium include various media such as a TV broadcast wave, a radio broadcast wave, and the Internet through which the data for generating the picture and the audio can be acquired.

Here, the recording medium is preferably a portable recording medium (so-called removable medium) such as a BD, but the present invention can be applied to a non-portable recording medium. Further, examples of the recording medium of a scheme under which the reproduction of the picture and the audio is controlled by executing a control program recorded on the recording medium include a BD, but the present invention can be applied to any recording medium without being limited to the BD as long as the recording medium is of the scheme under which the reproduction of the picture and the audio is controlled by executing the control program recorded on the recording medium along with the data on the content.

The content reproducing system according to the present invention includes: unit (hereinafter, referred to as "first reproduction control unit") configured to control reproduction of a content based on data acquired from another medium among the plurality of kinds of medium excluding a predetermined recording medium (BD 41 in the embodiment) on which the content including the picture and the audio and the program for controlling the reproduction of the content are recorded together; and unit (hereinafter, referred to as "second reproduction control unit") configured to control the reproduction of the content by executing a program (BD-J program in the embodiment) read from the predetermined recording medium.

Further, the program for controlling the reproduction of the content is a program for controlling reproduction contents, a reproduction sequence for a content, or the like in the reproduction of the picture, the audio, and the like, and is distinguished from the data itself for generating a picture signal and an audio signal. For example, the program is a content control program for controlling the reproduction of the content that is recorded on the recording medium along with the program and read by the reading device. The second reproduction control unit controls the reproduction of the picture and the audio by executing the control program. The control program is, for example, a BD-J program for controlling a BD-J title recorded on a BD, and is managed as a process (task) by a central processing unit (CPU) or a program execution environment and controlled by using a variable, a stack, and the like defined inside the program.

In the present invention, when the operation of ejecting the recording medium on which the program being executed is recorded from the reading device is performed, a type of the program being executed is judged by the program judging unit, and according to a result of the judging, management is performed for reproduction control different from the conventional mode management. Specifically, in the present invention, when the eject operation is detected, it is judged whether or not the program being executed is the continuing program, and if it is judged that the program being executed is not the continuing program, the reproduction control (reproduction control performed by the second reproduction control unit) performed by the execution of the program is stopped, and the reproduction control (reproduction control performed by the first reproduction control unit) for the content based on the data acquired from any medium among the plurality of kinds of medium excluding the recording medium is started to thereby provide the user with the same function as the conventional mode management (technique in which switchover to another mode is automatically performed in conjunction with the ejecting of the disc), while if it is judged that the control program being executed is to be continuously executed, the control program is continuously executed without starting the reproduction control performed by the first reproduction control unit, which allows a behavior in accordance with the intention of the producer. Note that in the present invention, the ejecting of the recording medium generically refers to an operation in which the recording medium is removed from the reading device, including not only a case where the recording medium is ejected by an eject mechanism provided to the reading device but also a case where the recording medium is removed by the user's manual operation.

Further, the content reproducing system according to the present invention may further be connected to a storage device that retains setting contents set in advance. The control apparatus may further include a setting contents acquiring unit configured to acquire, from the storage device, the setting contents specifying whether or not to continue the execution of the continuing program in a case where the recording medium is ejected. The reproduction control switching unit may further perform the switching of the reproduction control even if it is judged that the program is the continuing program but if a setting specifying that the execution of the continuing program is not to be continued is acquired by the setting contents acquiring unit. In the case where the eject operation for the recording medium is performed during the execution of the continuing program, it is decided whether or not to continue the execution of the program according to the setting contents set in advance, which makes it possible to perform such mode management as to reflect the user's intention more reliably.

Further, the content reproducing system according to the present invention may further include an input receiving unit configured to receive an input of a selection of a user, which specifies whether or not to continue the execution of the continuing program in a case where the recording medium is ejected. The reproduction control switching unit may further perform the switching of the reproduction control even if it is judged that the program is the continuing program but if an input specifying that the execution of the continuing program is not to be continued is received by the input receiving unit. By receiving the input of the selection when the eject operation is performed and performing the switching of the reproduction control according to the received selection, the user's judgment according to the recording medium related to the reproduction and a situation upon the reproduction can be reflected upon the mode management.

Further, the present invention can be grasped also as the invention related to the content reproduction control method, a control program, and a computer-readable recording medium on which the control program is recorded. For example, according to the present invention, there may be provided a control method for a content reproducing system that performs reproduction of a content based on data acquired from at least one of a plurality of kinds of medium. The control method includes executing, by a content reproducing apparatus connected to a reading device that is capable of loading and ejecting a recording medium on which a program for controlling the reproduction of the content is recorded and reads data from the loaded recording medium: detecting an eject operation for the recording medium from the reading device is performed during reproduction control in which the reproduction of the content is controlled by executing the program read from the recording medium by the reading device; judging, if the eject operation is detected in the eject operation detecting, whether or not the program being executed is a continuing program to be continuously executed even after the ejecting of the recording medium; and performing, if it is judged that the program is not the continuing program, switching of the reproduction control by stopping the reproduction control performed by execution of the program and by starting the reproduction control for the content based on the data acquired from any medium among the plurality of kinds of medium excluding the recording medium. If it is judged that the program is the continuing program, the reproduction control performed by execution of the continuing program is continued.

According to the present invention, it becomes possible to provide the content reproducing system, in which the program read from the recording medium such as a BD is used to control the reproduction of the picture and the audio, with the function equivalent to the mode management for the conventional reproduction apparatus even if the recording medium is ejected during the execution of such a program, and with the behavior in accordance with the intention of the producer of the recording medium as necessary.

DESCRIPTION OF EMBODIMENTS

First Embodiment

Figure 1:
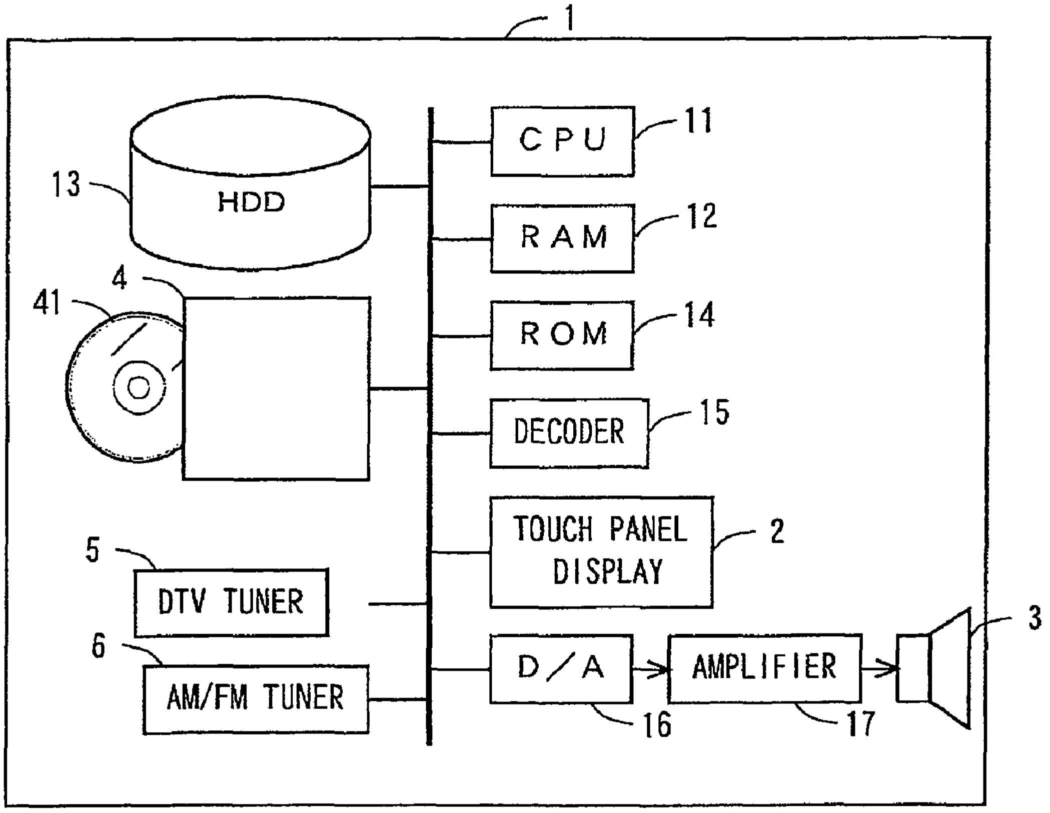
FIG. 1 is a diagram illustrating an outline of a hardware configuration of a content reproducing system according to an embodiment.

Hereinafter, description is made of a content reproducing system provided with a control apparatus according to an embodiment of the present invention by referring to the drawings. Note that in the embodiment, a case where the content reproducing system is implemented as an on-vehicle machine is described. However, the content reproducing system may be used as the on-vehicle machine and used for other various purposes including content reproducing systems installed indoors and outdoors for their use and a mobile terminal.

FIG. 1 is a diagram illustrating an outline of a hardware configuration of the content reproducing system according to the embodiment. A content reproducing system 1 according to the embodiment includes a random access memory (RAM) 12, a read only memory (ROM) 14, a central processing unit (CPU) 11 that controls an entire system by processing commands and data developed in the RAM 12 or the like, a hard disc drive (HDD) 13 on which various items of data used by the system such as various programs loaded into the RAM 12 are stored, a decoder (digital signal processor) 15, a D/A converter 16 that converts a digital signal transferred from the decoder 15 into an analog signal, an amplifier 17, a touch panel display 2, a speaker 3, a multi drive 4, a digital TV tuner 5, and an AM/FM tuner 6, which are electrically connected to one another via a bus or the like.

The content reproducing system 1 according to the embodiment is the content reproducing system 1 that can generate a picture signal and an audio signal based on data acquired from a medium selected from among a plurality of media including various discs loaded on the multi drive 4, the digital TV tuner 5, the AM/FM tuner 6, and the HDD 13, and can perform reproduction via the touch panel display 2 and the speaker 3.

The multi drive 4 is an optical disc drive on which discs (recording media) of a plurality of standards, such as a CD, a DVD, and a BD, can be loaded and read. In the system according to the embodiment, information read from the disc such as a BD 41 loaded on the multi drive 4 is transmitted to the decoder 15. The decoder 15 generates a picture signal and a sound signal based on the read information. Then, by outputting the picture signal and the sound signal generated by the decoder 15 to the touch panel display 2 and the speaker 3, the content reproducing system 1 performs reproduction of a picture and a sound.

Further, in the embodiment, disc loading is performed in such a manner that when a disc is inserted halfway into a slot for inserting the disc, the disc is automatically taken in by a disc loading mechanism provided to the multi drive 4. In addition, disc ejecting is performed in such a manner that when a signal that instructs to eject the disc is fed to the multi drive 4, the multi drive 4 automatically ejects the disc from the slot by a provided disc eject mechanism. In other words, the multi drive 4 according to the embodiment is the multi drive 4 of a so-called slot loading scheme. However, a disc loading/ejecting scheme employed for the multi drive 4 may be any scheme that allows detection of a load operation and an eject operation for a disc, and is not limited to the slot loading scheme as already described.

Note that in the embodiment, the picture signal and the sound signal based on the information read from the disc are generated by the decoder 15, which is a so-called digital signal processor (DSP) or the like, but a decoding processing may be performed by the CPU 11 that executes a decoding program developed in the RAM 12 or the like. Further, a processing of the picture signal and a processing of the sound signal based on the information read from the disc may be processed by one processor or may be processed by dedicated processors that are mutually different.

The touch panel display 2, which is an input/output device (user interface) for a user in the system, is controlled by the CPU 11 to thereby display an image for notifying the user of some information, and detects the user's touching operation with respect to an image display portion to thereby receive the user's operation. Note that the content reproducing system 1 receives the user's operation also through various buttons or the like (not shown) provided to the system 1 in addition to the touching operation with respect to the touch panel display 2. The contents input via the touch panel display 2, the buttons, and the like are recorded in the RAM 12, and processed by the CPU 11. Further, a notification or the like sent to the user by the system may be output in the sound format via the speaker 3.

Figure 2:
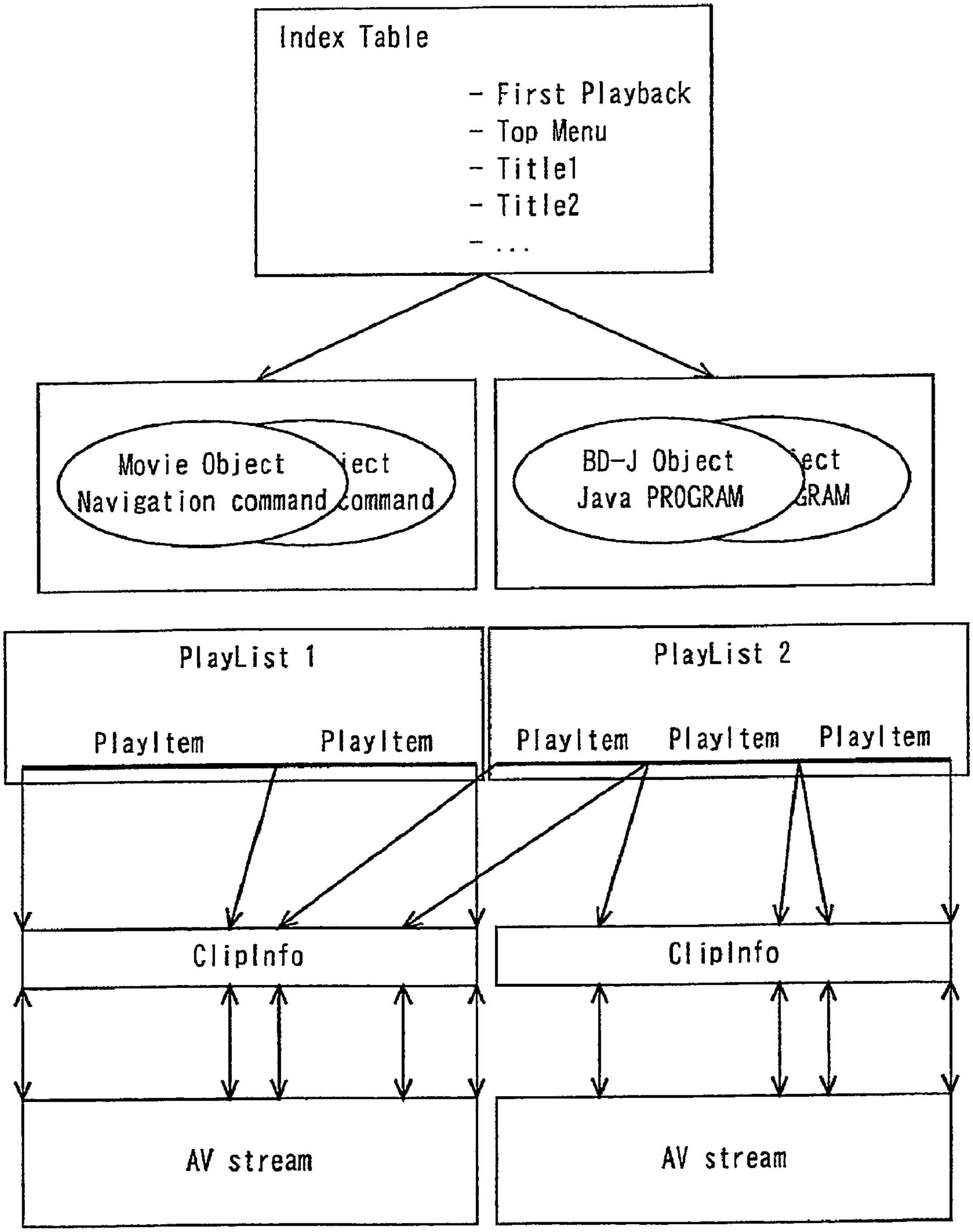
FIG. 2 is a diagram illustrating a data structure of a Blu-ray Disc according to the embodiment.

FIG. 2 is a diagram illustrating a data structure of the Blu-ray Disc according to the embodiment. Recorded on the Blu-ray Disc are: an Index table that is a list of one or a plurality of titles (here, "title" is a unit representing a group of contents) contained in the disc; Movie Objects for controlling the reproduction contents of the HDMV title; BD-J Objects for controlling the reproduction contents of the BD-J title; PlayLists operated from the BD-J Objects; PlayItems aligned in a reproduction sequence within the PlayList; ClipInfos for storing information of stream files referenced by the PlayItems; and AV Streams that are stream files including actual picture, sound data, and the like.

Here, the Index table has the list of titles in formats such as a First Playback, a Top Menu, a Title1, a Title2, and the like, and includes information indicating which one of the HDMV title and the BD-J title each title is (hereinafter, the information is referred to as "content control scheme identification flag"). By referencing the content control scheme identification flag, which one of the HDMV title and the BD-J title the title related to the reproduction is can be judged.

Then, if the title related to the reproduction is the HDMV title, the Movie Object is selected, and a Navigation Command is used to control the PlayList, the Top Menu, the Title, and the like in a similar manner to a conventional DVD video. Alternatively, if the title related to the reproduction is the BD-J title, the BD-J Object is selected, and a Java program (corresponding to the content control program of the present invention, hereinbelow, referred to as "BD-J program") included in the BD-J Object is executed to thereby control the PlayList, the Top Menu, the Title, and the like. Note that the BD-J program performs control of the reproduction contents by specifying IDs assigned to the PlayList and the like. Further, there are an interactive-type title and a moving-type title as the BD-J titles, which can be discriminated by referencing the title reproduction type recorded on the BD 41. The interactive-type content is an interaction-based content with which how the content is reproduced varies depending upon the user's operation, and examples thereof include a game with which the reproduction contents and results vary depending upon the user's operation.

The BD-J title reproduced in the embodiment is controlled by executing the BD-J program recorded on the BD 41 along with the content. More specifically, the BD-J program is managed as a process (task) by an operating system (OS) or an execution environment of the system, is assigned with an execution area, and uses a stack, a variable, and the like to advance the processing.

Figure 3:
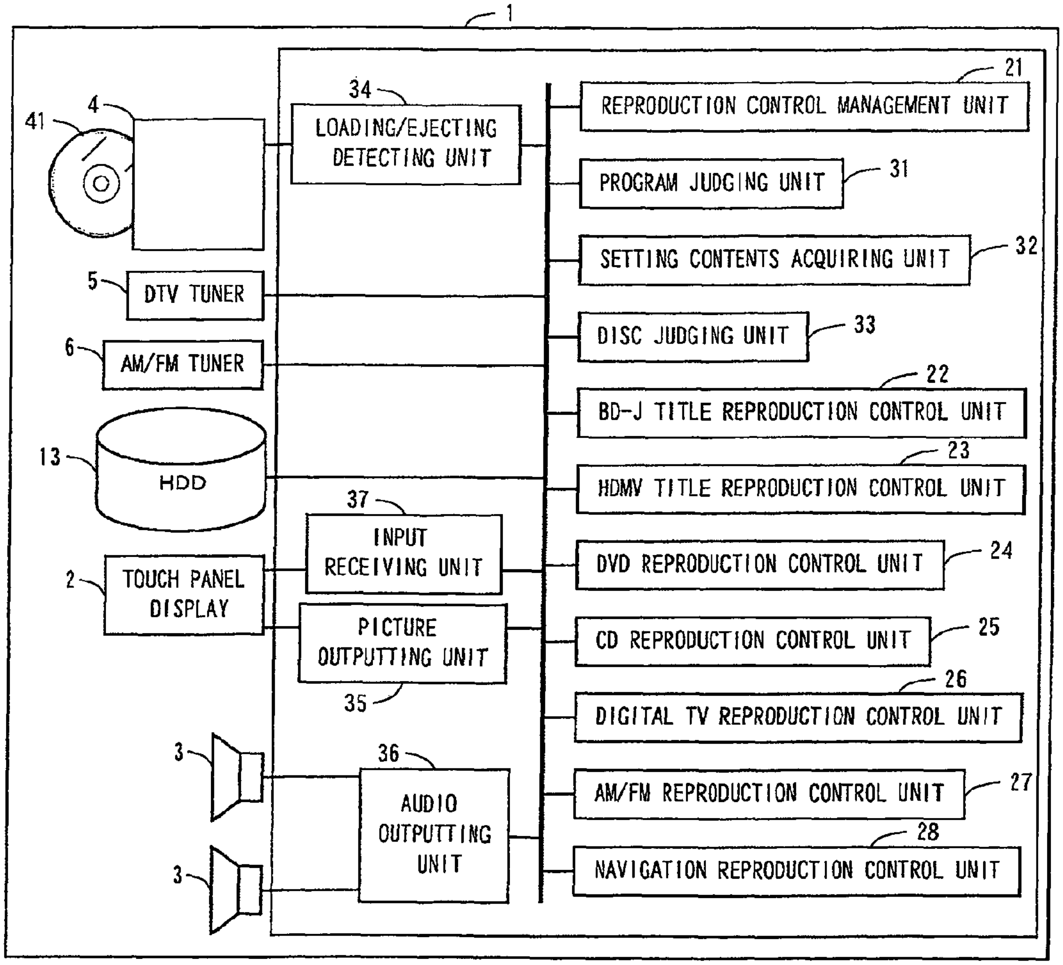
FIG. 3 is a diagram illustrating an outline of a functional configuration of the content reproducing system according to the embodiment.

FIG. 3 is a diagram illustrating an outline of a functional configuration of the content reproducing system 1 according to the embodiment. The system according to the embodiment functions as the content reproducing system 1 including: each of reproduction control units (BD-J title reproduction control unit 22, HDMV title reproduction control unit 23, DVD reproduction control unit 24, CD reproduction control unit 25, digital TV reproduction control unit 26, AM/FM reproduction control unit 27, and navigation reproduction control unit 28) that controls the reproduction of at least one of the picture and the audio based on the data acquired from the medium by using the control scheme corresponding to the medium by the CPU 11 interpreting and executing a content reproducing program developed in the RAM 12 or the ROM 14; a loading/ejecting detecting unit 34 that detects that the load operation or the eject operation for the BD 41 has been performed with respect to the multi drive 4; a reproduction control management unit 21 that manages starting, stopping, and the like of each of the reproduction control units; a program judging unit 31 that judges whether or not a BD-J program that is being executed by the BD-J title reproduction control unit 22 is a program to be continuously executed even after the ejecting of the BD 41; a setting contents acquiring unit 32 that acquires setting contents and the like stored in the HDD 13; a picture outputting unit 35 that performs an output of the picture signal generated by each of the reproduction control units; an audio outputting unit 36 that performs an output of the audio signal generated by each of the reproduction control units; an input receiving unit 37 that receives contents of the users input via a touch panel display or various buttons; and a disc judging unit 33 that judges whether or not the disc loaded on the multi drive 4 is the subsequent BD 41.

Note that the reproduction control management unit 21 corresponds to the reproduction control switching unit of the present invention, the HDMV title reproduction control unit 23, the DVD reproduction control unit 24, the CD reproduction control unit 25, the digital TV reproduction control unit 26, the AM/FM reproduction control unit 27, and the navigation reproduction control unit 28 among the respective reproduction control units correspond to the first reproduction control unit of the present invention, and the BD-J title reproduction control unit 22 corresponds to the second reproduction control unit of the present invention.

Each of the reproduction control units reproduces a content by using a control scheme corresponding to the content acquired from each corresponding medium. For example, if the content read from the BD 41 is the HDMV title, according to a command in HDMV, the HDMV title reproduction control unit 23 controls the reproduction of the content, and if the content read from the BD 41 is the BD-J title, the BD-J title reproduction control unit 22 controls the reproduction of the content by executing the BD-J program read from the same BD 41. Note that in the embodiment, the reproduction control management unit 21 references a content control scheme identification flag recorded on the BD 41 to judge which one of the HDMV title and the BD-J title the content of a reproduction subject (content currently being reproduced or to be reproduced hereafter) is.

The BD-J title reproduction control unit 22 among the reproduction control units controls the reproduction of the BD-J title by executing the BD-J program for controlling the reproduction of the BD-J title, which is read from the BD 41. Here, some of the BD-J programs executed by the BD-J title reproduction control unit 22 are intended to remain in the RAM of the content reproducing system 1 to be continuously executed even after the ejecting of the disc on which the program is recorded. By referencing the contents of the BD-J program, it is possible to judge whether or not the BD-J program is to be continuously executed even after the ejecting of the disc.

Figure 4:
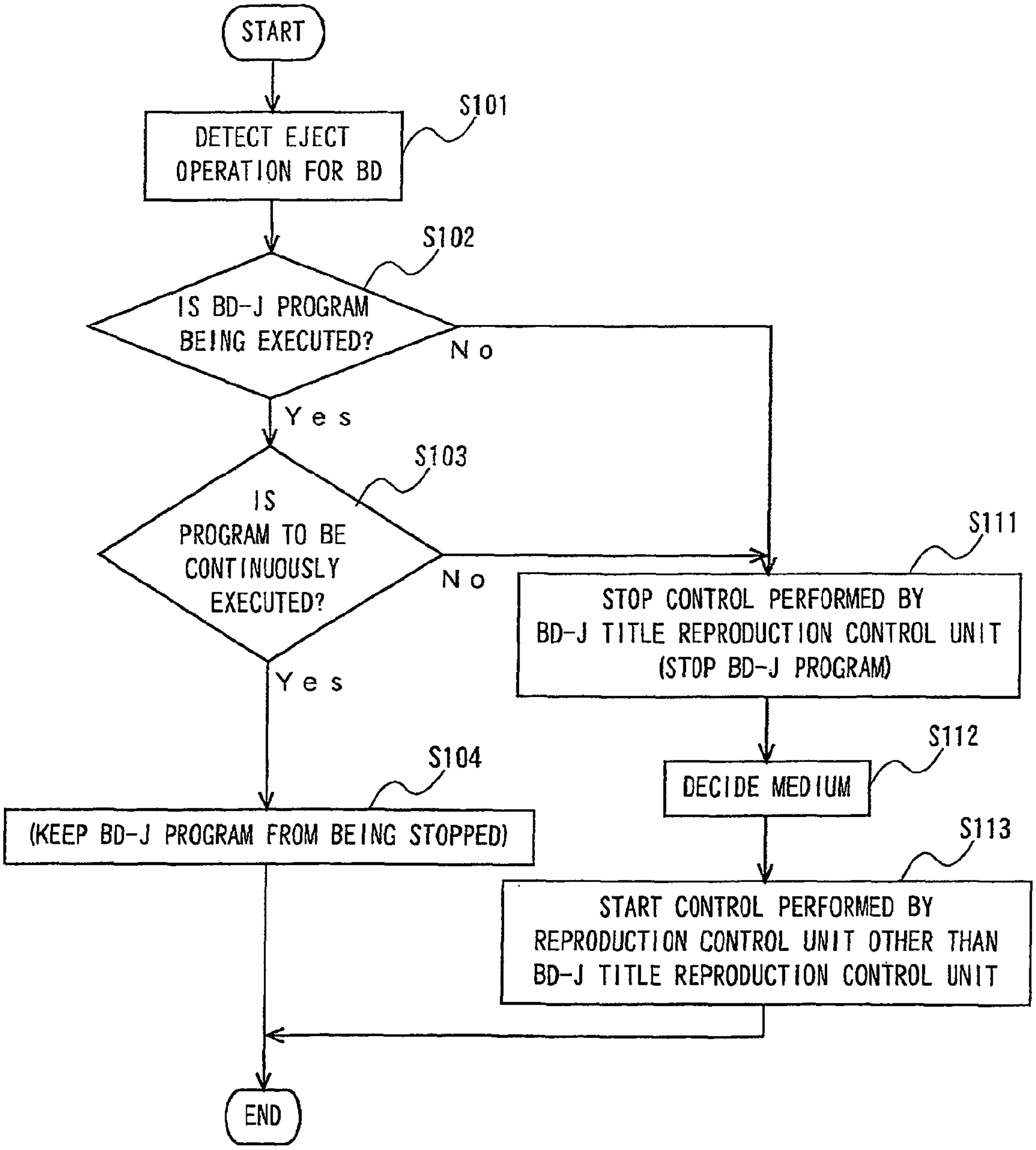
FIG. 4 is a flowchart illustrating a flow of a reproduction control switching processing in conjunction with disc eject according to the embodiment.

Hereinafter, a flowchart is used to describe contents of a reproduction control switching processing (mode switching processing) in the embodiment. FIG. 4 is a flowchart illustrating a flow of the reproduction control switching processing in conjunction with disc eject according to the embodiment. The processing illustrated in the flowchart is started by such a trigger that the eject operation of the BD 41 is performed during the reproduction of the content based on the BD 41 loaded on the multi drive 4. Note that a processing order of the reproduction control switching processing according to the present invention can be appropriately changed in combination depending upon the embodiment, and the processing order is not limited to the following example.

In Step S101, the eject operation for the BD 41 is detected. The loading/ejecting detecting unit 34 detects that the eject operation for the disc by the user via the touch panel display or various buttons is performed with respect to the multi drive 4, or that the eject operation has been performed on the multi drive 4 followed by the ejecting of the disc. After that, the processing advances to Step S102.

Note that in the embodiment, when the eject operation is performed, a signal that instructs to eject the disc is fed to the multi drive 4, and the multi drive 4 that has received the instruction ejects the loaded BD 41. Here, a timing for instructing the multi drive 4 to eject the disc and causing the disc to be ejected actually may be immediately after the eject operation detected in Step S101 or other such timing including the before/after the processing illustrated by Step S104 or Step S111 described later, for example.

It is judged in Step S102 whether or not the reproduction control, which is being performed at a time point of the eject operation, is the reproduction control by the BD-J title reproduction control unit 22. At a time point when the eject operation for the BD 41 is detected in Step S101, the reproduction control management unit 21 judges whether or not the BD-J program related to the ejected BD 41 is being executed, in other words, whether or not a title that has been reproduced is a BD-J content. If it is judged that the title that has been reproduced is the BD-J title and is being controlled by the BD-J program, the processing advances to Step S103. If it is judged that the title that has been reproduced is not the BD-J title and that the BD-J program is not being executed (in other words, the reproduced title is the HDMV title or the like), the processing advances to Step S111.

In Step S103, it is judged whether or not the BD-J program being executed by the BD-J title reproduction control unit 22 is a continuing program to be continuously executed even after the ejecting of the BD 41 on which the program is recorded. If it is judged in Step S102 that the BD-J program is being executed, the program judging unit 31 judges whether or not the BD-J program being executed is a program intended to be continuously executed even after the ejecting of the disc. The BD-J program intended to be continuously executed includes information indicating that the program is to be continuously executed even after the disc ejecting, and hence the program judging unit 31 can judge whether or not the BD-J program being executed is a continuing program by referencing the contents of the BD-J program being executed. If it is judged that the BD-J program intended to be continuously executed is being executed, the processing advances to Step S104. If it is judged that the BD-J program is being executed but is not a continuing program, the processing advances to Step S111.

In Step S104, the BD-J program that has been executed since before the eject operation for the BD 41 is continuously executed. In other words, if the eject operation for the BD 41 is detected, but if the reproduction control due to the execution of the BD-J program is being performed, and if the BD-J program being executed is a continuing program, the execution of the continuing program is continued, and function mode switching (switching of the reproduction control) such as a conventional mode management technique is not performed. Therefore, the output controlled by the BD-J program that has been executed since before the eject operation for the BD 41 is successively performed from the touch panel display 2 and the speaker 3. The output contents are, for example, a picture, an audio, and the like for use in a game or the like if the BD-J program that has been executed since before the eject operation for the BD 41 is the game or the like, and are a picture, an audio, and the like including a message that prompts the loading of the subsequent disc if the BD-J program that has been executed since before the eject operation for the BD 41 is the content existing across a plurality of BDs 41. In Step S104, the execution of the BD-J program is continued, and after that, the processing illustrated in the flowchart is brought to an end.

If it is judged in Step S102 that the BD-J program is not being executed, or if it is judged in Step S103 that the BD-J program is being executed but is not a continuing program, the processing advances to Step S111.

In Steps S111 to S113, the execution of the BD-J program is stopped, control of the content reproduction from a medium other than the ejected BD 41 as a source is started, and the reproduction of the picture and the audio based on the medium other than the BD 41 is performed. More specifically, by stopping the execution of the BD-J program performed by the BD-J title reproduction control unit 22, the reproduction control management unit 21 stops the reproduction control for the picture and the audio performed by the BD-J title reproduction control unit 22 (Step S111). Further, from among the media excluding the BD, in other words, digital TV broadcast, radio broadcast, an HDD on which a navigation-purpose program is recorded, and the like, the reproduction control management unit 21 decides a medium to be controlled by a reproduction control unit other than the BD-J title reproduction control unit 22 and the reproduction control unit therefor (Step S112), and causes the reproduction control unit related to the decided medium to start the reproduction control (Step S113).

In other words, the reproduction control management unit 21 specifies any one of the reproduction control units excluding the BD-J title reproduction control unit 22, such as the digital TV reproduction control unit 26, the AM/FM reproduction control unit 27, and the navigation reproduction control unit 28, to cause the reproduction control to be started thereby. When the reproduction control is started, at least one of the picture signals and the audio signals generated based on any medium decided by the reproduction control management unit 21 are output to the touch panel display 2 and the speaker 3.

In other words, in Steps S111 to S113, the same processing as the mode switching processing conventionally performed particularly on the on-vehicle machine or the like, in which a disc reproduction function is stopped and the reproduction based on another medium is started in conjunction with the ejecting of the disc, is performed. Therefore, if the title that has been reproduced on the ejected BD is not the BD-J title, or if the BD-J program being executed is not a program to be continuously executed, the user can be provided with a conventionally-familiar mode switching. function in conjunction with a disc eject operation. After that, the processing illustrated in the flowchart is brought to an end.

Note that when the medium for which the reproduction is to be started (and the reproduction control unit at which the control therefor is to be started) is decided in conjunction with the eject operation for the BD 41 in Step S112 described above, the reproduction control management unit 21 may decide a preset medium and the reproduction control unit therefor as the medium and the reproduction control unit to be started in conjunction with the eject operation, or may decide a medium reproduced last before the reproduction of the ejected BD 41 has been started and the reproduction control unit therefor (so-called last mode) as the medium and the reproduction control unit to be started in conjunction with the eject operation.

Further, a message, an icon, or the like for notifying the user of the medium or the contents of the picture and the audio currently being output to a display area may be displayed in the display area. For example, by displaying "BD" in a case where the picture and the audio of the BD-J title controlled by the BD-J program being continuously executed are being output, and "DTV" in a case where the picture and the audio by the digital TV reproduction control unit 26 at which the control therefor has been started in conjunction with the eject operation are being output, it is possible to allow the user to grasp a change of a function mode switched in conjunction with the disc eject and to prevent the user from being confused.

Next, description is made of an outline of a processing performed in a case where the BD 41 is loaded onto the multi drive 4 in a state in which the BD-J program is being continuously executed after the BD 41 is taken out, in other words, a state in which the processing illustrated in FIG. 4 is ended after the processing of Step S104 is performed.

First, the loading/ejecting detecting unit 34 detects that the load operation for the disc by the user has been performed with respect to the multi drive 4, or that the disc has been loaded by performing the load operation on the multi drive 4. Then, the disc judging unit 33 reads information for identifying a disc from the BD 41 related to the loading detection, and compares the information with information indicating the subsequent disc which is indicated by the BD-J program being executed to thereby judge whether or not the loaded BD 41 is the subsequent disc for the BD 41 for which the eject operation has been detected in Step S101 of FIG. 4. Then, in a case of a match in identification information or other such case where the loaded disc has been judged as the subsequent disc, the BD-J program being continuously executed starts the reproduction control for the picture and the audio using the data read from the newly-loaded BD, and reproduces the picture and the audio related to the loaded BD.

In contrast, if it is judged that the loaded disc is a disc other than the subsequent disc, the reproduction of the content based on the newly-loaded BD 41 is started. According to the title control scheme recorded on the loaded BD 41, the reproduction control management unit 21 causes the BD-J title reproduction control unit 22 or the HDMV title reproduction control unit 23 to start a reproduction processing based on the loaded BD 41. Note that if the title to be reproduced first on the loaded BD 41 is the BD-J title, and if the BD-J title reproduction control unit 22 cannot execute a plurality of BD-J programs, the execution of a continuously-executed program being continuously executed may be stopped.

Figure 5:
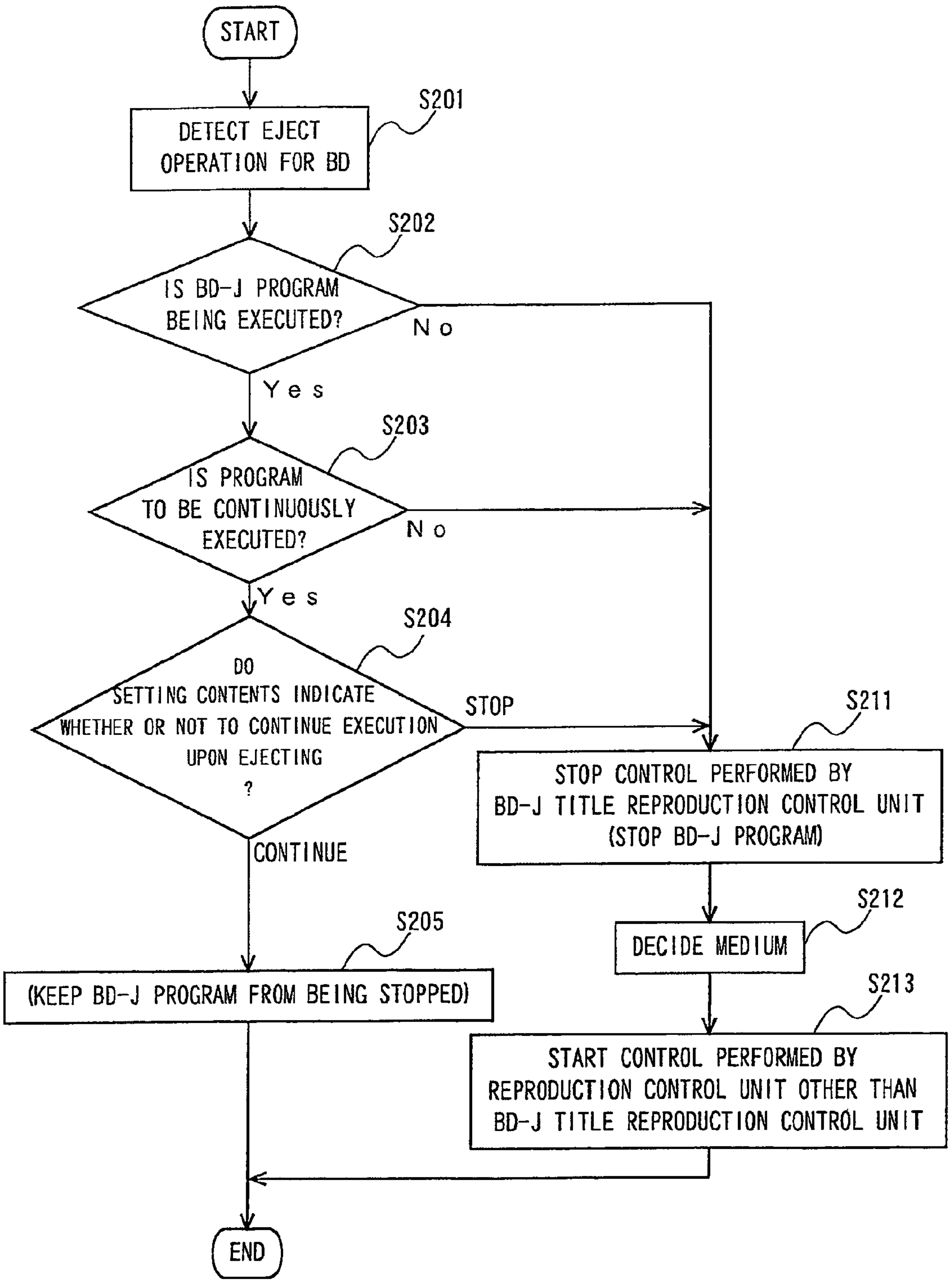
FIG. 5 is a flowchart illustrating a flow of the reproduction control switching processing in conjunction with the disc eject, which can be executed instead of the processing illustrated in FIG. 4 in the embodiment.

In the reproduction control switching processing described referring to FIG. 4, judgment as to whether to switch the reproduction control according to the same mode management technique as a conventional one or to continuously execute the BD-J program without switching the reproduction control is decided based on an execution state of the BD-J program and the kind of BD-J program. However, processing contents may be decided in further consideration of contents preset for the content reproducing system 1 or results of the user's selection. FIG. 5 is a flowchart illustrating a flow of the reproduction control switching processing in conjunction with the disc eject, which can be executed instead of the processing illustrated in FIG. 4 in the embodiment. As in the processing illustrated in FIG. 4, the processing illustrated by the flowchart is started by such a trigger that the eject operation for the BD 41 is performed during the reproduction of the content based on the BD 41 loaded on the multi drive 4. Note that the processing order of the reproduction control switching processing according to the present invention can be appropriately changed in combination depending upon the embodiment, and the processing order is not limited to the following example.

In Steps S201 to S203, the eject operation for the BD 41 is detected, and it is judged whether or not the BD-J program to be continuously executed is being executed. Details of the processing illustrated by Steps S201 to S203 are substantially the same as those of the processing of Steps S101 to S103 described referring to FIG. 4, and hence description thereof is omitted. If it is judged in Steps S202 and S203 that the BD-J program to be continuously executed is being executed at the time point when the eject operation is detected, the processing advances to Step S204. If it is judged in Step S202 that the BD-J program is not being executed, or if it is judged in Step S203 that the BD-J program is being executed but is not a continuing program, the processing advances to Step S211.

In Step S204, the setting contents for the content reproducing system 1 are referenced. Here, the HDD 13 stores such setting contents as to indicate, upon the ejecting of the BD 41, whether to continuously execute the continuing program or to perform the switching to the reproduction control by another reproduction control unit without continuing the execution. The reproduction control management unit 21 references the setting contents acquired from the HDD 13 by the setting contents acquiring unit 32 to decide whether or not to actually continue the execution of the continuing program. If the setting contents acquired from the HDD 13 are the setting contents indicating the continuous execution of the continuing program, the processing advances to Step S205. If the setting contents acquired from the HDD 13 are the setting contents indicating stopping the execution of even the continuing program, the processing advances to Step S211.

With the arrangement, according to the content reproducing system 1 according to the embodiment, even when the BD-J program intended to be continuously executed is being executed upon the eject operation for the BD 41, it is possible by having the setting contents saved on the HDD 13 in advance to stop the BD-J program and perform the switching of the reproduction control. For example, by storing on the HDD 13 the setting contents indicating that the execution of the continuing program is not to be continued, it is possible to allow the user who does not wish the continuous reproduction of the content related to the BD 41 after the ejecting of the BD 41 to perform the mode switching processing as the user hopes when performing the operation of ejecting the BD 41 in the content reproducing system 1.

In Step S205, the execution of the BD-J program that has been executed since before the eject operation for the BD 41 is continued. Details of the processing illustrated by Step S205 are substantially the same as those of the processing of Step S104 described referring to FIG. 4, and hence description thereof is omitted. After that, the processing illustrated by the flowchart is brought to an end.

In Steps S211 to S213, the execution of the BD-J program is stopped, the control of the content reproduction from the medium other than the ejected BD 41 as a source is started, and the reproduction of the picture and the audio based on the medium other than the BD 41 is performed. Details of the processing illustrated by Steps S211 to S213 are substantially the same as those of the processing of Steps S111 to S113 described referring to FIG. 4, and hence description thereof is omitted. In other words, in Steps S211 to S213, the same processing as the mode switching processing conventionally performed particularly on the on-vehicle machine or the like, in which the disc reproduction function is stopped and the reproduction based on another medium is started in conjunction with the ejecting of the disc, is performed. After that, the processing illustrated by the flowchart is brought to an end.

Figure 6:
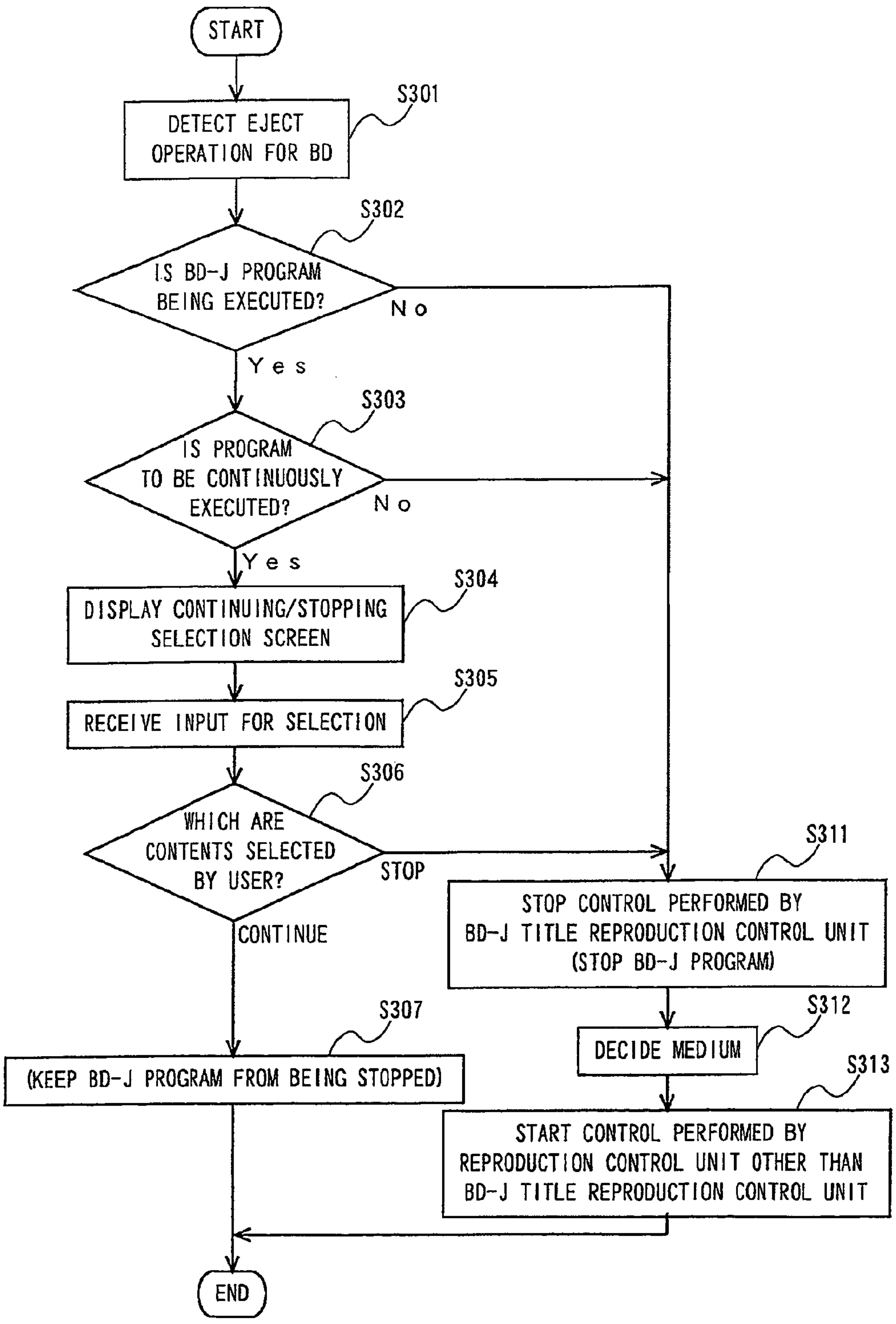
FIG. 6 is a flowchart illustrating a flow of the reproduction control switching processing in conjunction with the disc eject, which can be executed instead of the processing illustrated in FIG. 4 in the embodiment.

FIG. 6 is a flowchart illustrating a flow of the reproduction control switching processing in conjunction with the disc eject, which can be executed instead of the processing illustrated in FIG. 4 in the embodiment. As in the processing illustrated in FIG. 4, the processing illustrated by the flowchart is started by such a trigger that the eject operation for the BD 41 is performed during the reproduction of the content based on the BD 41 loaded on the multi drive 4. Note that the processing order of the reproduction control switching processing according to the present invention can be appropriately changed in combination depending upon the embodiment, and the processing order is not limited to the following example.

In Steps S301 to S303, the eject operation for the BD 41 is detected, and it is judged whether or not the BD-J program to be continuously executed is being executed. Details of the processing illustrated by Steps S301 to S303 are substantially the same as those of the processing of Steps S101 to S103 described referring to FIG. 4, and hence description thereof is omitted. If it is judged in Steps S302 and S303 that the continuing program is being executed at the time point when the eject operation is detected, the processing advances to Step S304. If it is judged in Step S302 that the BD-J program is not being executed, or if it is judged in Step S303 that the BD-J program is being executed but is not a continuing program, the processing advances to Step S311.

In Step S304, a screen that allows the user to select whether to actually continue the continuing program or to stop the continuing program is displayed. The picture outputting unit 35 causes the touch panel display 2 to display a continuing/stopping selection screen thereon. In other words, in a case where the processing according to the flowchart is executed, when the user performs the eject operation for the BD 41 via the touch panel display 2 or various buttons provided to the content reproducing system 1, such display of choices is subsequently performed on the touch panel display as buttons that are provided with messages “Continuously execute application.”, “Stop application being executed.”, and the like and can be selected by the user. Here, pictures by the control of the BD-J program being continuously executed (for example, a display screen for a message “Insert Disc 2.” or the like, a game screen, and a menu screen) are displayed on the touch panel display 2, and hence the display of choices as already described is performed so as to be overlaid on the picture displayed by the control of the BD-J program.

In Steps S305 and S306, according to the selection input by the user, it is decided whether or not to continuously execute the continuing program. The user views the display of choices performed in Step S304 and judges whether to actually continue the continuing program or to stop the continuing program, and the input receiving unit 37 receives the input for the selection made by the user via the touch panel display 2 or various buttons provided to the content reproducing system 1 (Step S305). Then, the reproduction control management unit 21 judges which of the continuous execution of the continuing program and the stopping thereof the user’s selection received by the input receiving unit 37 is (Step S306). If it is judged that the user’s selection is the continuous execution of the program, the processing advances to Step S307. If it is judged that the user’s selection is the stopping of the execution of the program, the processing advances to Step S311.

With the arrangement, according to the content reproducing system 1 according to the embodiment, even when the BD-J program intended to be continuously executed is being executed upon the eject operation for the BD 41, it is possible to perform an inquiry of the user at each time of the eject operation and to perform the mode switching processing in accordance with the user’s hope. For example, according to the embodiment, in a case where the eject operation is performed for the BD 41 for which the subsequent disc exists, it is possible to judge whether the eject operation is the eject operation performed for the purpose of replacement with the subsequent disc or the eject operation performed for the purpose of switching to audiovisual enjoying of the content related to another medium, and to provide management of the reproduction control in accordance with the user’s intention.

In Step S307, the execution of the BD-J program that has been executed since before the eject operation for the BD 41 is continued. Details of the processing illustrated by Step S307 are substantially the same as those of the processing of Step S104 described referring to FIG. 4, and hence description thereof is omitted. After that, the processing illustrated by the flowchart is brought to an end.

In Steps S311 to S313, the execution of the BD-J program is stopped, the control of the content reproduction from the medium other than the ejected BD 41 as a source is started, and the reproduction of the picture and the audio based on the medium other than the BD 41 is performed. Details of the processing illustrated by Steps S311 to S313 are substantially the same as those of the processing of Steps S111 to S113 described referring to FIG. 4, and hence description thereof is omitted. After that, the processing illustrated by the flowchart is brought to an end.

According to the embodiment, it becomes possible to provide the content reproducing system 1, in which the BD-J program read from the BD 41 is used to control the reproduction of the picture and the audio, with a function equivalent to mode management for a conventional reproduction apparatus even if the BD 41 is ejected during the execution of the BD-J program, and with a behavior in accordance with an intention of a producer of the content contained in the BD 41 as necessary.

Second Embodiment

With the conventional technique for managing each reproduction function based on the mode switching operation, in a case where execution of a Java program is continued even if the disc is ejected from the reproduction apparatus, there is a fear that a BD reproduction mode that allows the execution of the Java program and a mode started in response to the disc eject may coexist, or that the execution of the Java program to be continuously executed may be forcefully terminated and may shift to another mode, which may lead to inconsistency of the mode management or confusion for the user. In particular, in the case where the execution of the Java program to be continuously executed is terminated, even if the subsequent disc is loaded, control may not be performed as expected by the producer of the content.

In view of the problems described above, it is an object of the present invention to provide a content reproducing apparatus, in which a program read from the recording medium such as the BD is used to control the reproduction of the picture and the audio, with the behavior in accordance with the intention of the producer of the recording medium without creating confusion for the user familiar with the mode management technique for the conventional reproduction apparatus even if the recording medium is ejected during execution of such a program.

In order to achieve the object described above, according to the present invention, it is judged whether or not the program being executed is to be continuously executed when the operation of ejecting the disc is detected, and if the program is to be continuously executed, the execution of the program is continued to cause two kinds of reproduction control to coexist even after the reproduction processing based on another medium is started, which makes it possible to provide the behavior in accordance with the intention of the producer of the recording medium without creating confusion for the user familiar with the mode management technique for the conventional reproduction apparatus.

To be described in detail, according to the present invention, there is provided a content reproducing apparatus that is capable of reproducing a plurality of kinds of medium, and performs reproduction of a content generated based on data acquired from at least one of the plurality of kinds of medium, the content reproducing apparatus being connected to a reading device that is capable of loading and ejecting a recording medium on which a program for controlling the reproduction of the content is recorded and reads data from the loaded recording medium, the content reproducing apparatus including:

a first reproduction control unit configured to control the reproduction of the content based on data acquired from any medium among the plurality of kinds of medium excluding the recording medium;

a second reproduction control unit configured to control the reproduction of the content by executing the program read from the recording medium by the reading device;

an eject operation detecting unit configured to detect that an eject operation for the recording medium from the reading device is performed during reproduction control performed by the second reproduction control unit;

a reproduction control management unit configured to manage starting and stopping of control performed by the first reproduction control unit and the second reproduction control unit, and causing the reproduction control performed by the first reproduction control unit to start in response to detection of the eject operation performed by the eject operation detecting unit; and a program judging unit configured to judge, if the eject operation is detected by the eject operation detecting unit, whether or not the program being executed by the second reproduction control unit is a continuing program to be continuously executed even after the ejecting of the recording medium, in which the reproduction control management unit causes, if it is judged that the program is the continuing program, the control performed by the second reproduction control unit executing the continuing program to be continued, and if it is judged that the program is not the continuing program, causes the control performed by the second reproduction control unit executing the program to be stopped.

The content reproducing apparatus according to the present invention is the content reproducing apparatus that performs the reproduction of the content including at least one of the picture and the audio generated based on the data acquired from the at least one of the plurality of kinds of medium. Here, in addition to the recording media such as a CD, a DVD, and a BD, the plurality of kinds of medium include various media such as a TV broadcast wave, a radio broadcast wave, and the Internet through which the data for generating the picture and the audio can be acquired.

In the present invention, unit for controlling content reproduction based on the data acquired from another medium among the plurality of kinds of medium excluding the recording medium on which the program for controlling the reproduction of the content including the picture and the audio is recorded is set as the first reproduction control unit, and unit for controlling the content reproduction by executing the program read from the recording medium is set as the second reproduction control unit.

Further, the program for controlling the reproduction of the content including the picture and the audio is a program for controlling reproduction contents, a reproduction sequence for a content, or the like in the reproduction of the picture and the audio, and is distinguished from the data itself for generating a picture signal and an audio signal. For example, the program is a content control program for controlling the reproduction of the content that is recorded on the recording medium along with the program and read by the reading device. The second reproduction control unit controls the reproduction of the picture and the audio by executing the control program. The control program is, for example, a BD-J program for controlling a BD-J title recorded on a BD, and is managed as a process (task) by a central processing unit (CPU) or a program execution environment and controlled by using a variable, a stack, and the like defined inside the program.

The second reproduction control unit executes the control program read by the reading device on which the recording medium is loaded. In the present invention, when the operation of ejecting the recording medium on which the program being executed is recorded from the reading device is performed, a type of the program being executed is judged by the program judging unit, and according to a result of the judgment, management is performed for reproduction control different from conventional mode management. Specifically, in the present invention, when an eject operation is detected, by starting the control performed by the first reproduction control unit, the user is provided with the same function as the conventional mode management (technique in which switchover to another mode is automatically performed in conjunction with the ejecting of the disc), while it is judged whether or not the control program being executed is to be continuously executed, and if it is necessary to perform the continuous execution, the control program is continuously executed to thereby allow the behavior in accordance with the intention of the producer. Note that in the present invention, the ejecting of the recording medium generically refers to an operation in which the recording medium is removed from the reading device, including not only a case where the recording medium is ejected by an eject mechanism provided to the reading device but also a case where the recording medium is removed by the user's manual operation.

Further, the content reproducing apparatus according to the present invention may be further connected to a display apparatus for displaying the picture included in the content, and may further include a picture compositing unit configured to reproduce, if the eject operation is performed and if it is judged that the program being executed is the continuing program, pictures after being subjected to such composition that a picture subjected to the reproduction control by the first reproduction control unit is displayed in a first display area of a display area on the display apparatus and that a picture subjected to the reproduction control by the second reproduction control unit is displayed in a second display area of the display area on the display apparatus.

Here, the first display area and the second display area are areas defined in the display area on the display apparatus. Examples of a method of providing the first display area and the second display area include a method of dividing a single display area on a display or the like into a plurality of areas and setting the divided areas as the first display area and the second display area and a method of providing a plurality of displays on the display apparatus. Further, even in the case of dividing a single display area, such various dividing methods may be employed as not only a method for division simply in a transverse direction or a vertical direction but also a method of defining a small screen like a window within the display area as the first or second display area.

Accordingly, by using the first and second display area to allow the picture controlled by the first reproduction control unit and the picture controlled by the second reproduction control unit to be reproduced simultaneously, the user can audiovisually enjoy a picture related to another medium expected to start in conjunction with the eject operation for the recording medium, and can further audiovisually enjoy a picture in accordance with the intention of the producer, which is controlled by the program to be continuously executed.

Further, the content reproducing apparatus according to the present invention:

may be further connected to a speaker that reproduces the audio included in the content, and may further include an audio superimposing unit configured to reproduce, if the eject operation is performed and if it is judged that the program being executed is the continuing program, audios obtained after superimposing an audio subjected to the reproduction control by the first reproduction control unit and an audio subjected to the reproduction control by the second reproduction control unit; and may be further connected to a plurality of speakers that reproduce the audio included in the content, and may further include an audio output destination control unit configured to cause, if the eject operation is performed and if it is judged that the program being executed is the continuing program, mutually different speakers to reproduce the audio subjected to the reproduction control by the first reproduction control unit and the audio subjected to the reproduction control by the second reproduction control unit.

With the arrangement, the user can audiovisually enjoy both an audio related to another medium started in conjunction with the eject operation for the recording medium and an audio in accordance with the intention of the producer, which is controlled by the program to be continuously executed. Note that, here, the audio superimposing unit or the audio output destination control unit may adjust a balance between a volume of the audio related to the first reproduction control unit and a volume of the audio related to the second reproduction control unit according to the contents of the audios.

Further, the content reproducing apparatus according to the present invention may further include a reproduction contents judging unit configured to judge whether or not the content controlled by using the continuing program includes an audio, and if it is judged by the reproduction contents judging unit that the content controlled by using the continuing program does not include the audio, the reproduction control management unit may cause the first reproduction control unit, at which the control is started when the execution of the continuing program is to be continued even after the detection of the eject operation, to control a medium from which only the audio is reproduced.

Further, the content reproducing apparatus according to the present invention may further include a reproduction contents judging unit configured to judge whether or not the content controlled by using the continuing program includes a picture, and if it is judged by the reproduction contents judging unit that the content controlled by using the continuing program does not include the picture, the reproduction control management unit may cause the first reproduction control unit, at which the control is started when the execution of the continuing program is to be continued even after the detection of the eject operation, to control a medium from which only the picture is reproduced.

In other words, according to the present invention, it is judged by the reproduction contents judging unit whether or not the content controlled by the second reproduction control unit includes the picture or the audio, and if only one thereof is included in the content, the first reproduction control unit is caused to control the reproduction of the content made up of only one of the picture and the audio that does not overlap the reproduction contents controlled by the second reproduction control unit. Accordingly, even if the content controlled by the first reproduction control unit and the content controlled by the second reproduction control unit are simultaneously reproduced by the execution of the continuing program, it is possible to prevent an occurrence of an overlap between pictures in displaying thereof onto the display apparatus or between audios in outputting thereof from the speaker.

Further, the content reproducing apparatus according to the present invention may further include:

a load operation detecting unit configured to detect that the load operation for the recording medium is performed with respect to the reading device during the execution of the continuing program being continuously executed even after the eject operation for the recording medium; and a recording medium judging unit configured to judge, if the load operation is detected, whether or not the recording medium related to the load operation is the recording medium intended to be loaded subsequently to the recording medium related to the eject operation, in which:

if it is judged by the recording medium judging unit that the recording medium related to the load operation is the recording medium intended to be loaded subsequently, the reproduction control management unit may stop the control of the content reproduction started by the first reproduction control unit upon the eject operation; and in conjunction with the stopping of the control performed by the first reproduction control unit, the picture compositing unit may terminate the compositing of the pictures, and may display the picture controlled by the second reproduction control unit in the entire display area on the display apparatus.

In other words, according to the present invention, if the subsequent recording medium expected by the continuing program being executed by the second reproduction control unit is loaded when the content controlled by the first reproduction control unit and the content controlled by the second reproduction control unit are being reproduced simultaneously, the control performed by the first reproduction control unit is stopped, and the picture or the audio based on the data read from the subsequent recording medium is subjected to the reproduction control by the continuing program. Accordingly, it becomes possible to perform the reproduction of the picture or the audio in accordance with the intention of the producer of the recording medium intended to be loaded subsequently. Further, from the fact that the user loads the subsequent recording medium, it can be considered that the user is hoping to audiovisually enjoy a sequence to the previously-ejected recording medium. In other words, according to the present invention, it is possible to provide the content reproducing apparatus in which the reproduction of the subsequent recording medium is started in conjunction with the loading of the subsequent recording medium, and at the same time, the reproduction of the unnecessary content (reproduction according to the first reproduction control unit) is automatically stopped, which is high in convenience and operability even for the user.

Further, according to the present invention, in conjunction with the detection of the loading of the subsequent recording medium and the termination of the reproduction control performed by the first reproduction control unit, the compositing of the pictures by the picture compositing unit is terminated, and the display method for the picture on the display apparatus is returned to normal display. Hence, the user can recognize from the change of the display method that the reproduction control performed by the first reproduction control unit has been terminated.

Further, the present invention can be grasped also as the invention related to the content reproduction control method, the control program, and a computer-readable recording medium on which the control program is recorded.

According to the present invention, it becomes possible to provide the content reproducing apparatus, in which the program read from the recording medium such as the BD is used to control the reproduction of the picture and the audio, with the behavior in accordance with the intention of the producer of the recording medium without creating confusion for the user familiar with the mode management technique for the conventional reproduction apparatus even if the recording medium is ejected during the execution of such a program.

Hereinafter, description is made of a content reproducing system according to a further embodiment of the present invention by referring to the drawings. A hardware configuration of the content reproducing system according to the embodiment is substantially the same as that described in the first embodiment by referring to FIG. 1, and hence description thereof is omitted. Further, a data structure of a Blu-ray Disc is substantially the same as that described in the first embodiment by referring to FIG. 2, and hence description thereof is omitted.

The BD-J title reproduced in the embodiment is controlled by executing the BD-J program recorded on the BD 41 along with the content. More specifically, the BD-J program is managed as a process (task) by an operating system (OS) or an execution environment of the system, is assigned with an execution area, and uses a stack, a variable, and the like to advance the processing. Therefore, if the reproduction processing is stopped by the same method as that in the case of the conventional DVD, the execution area in the RAM 12 for executing the BD-J program is freed, which causes the need to execute the program from the start point upon the subsequent execution, and hence the reproduction cannot be restarted from the previously stopped point.

Figure 7:
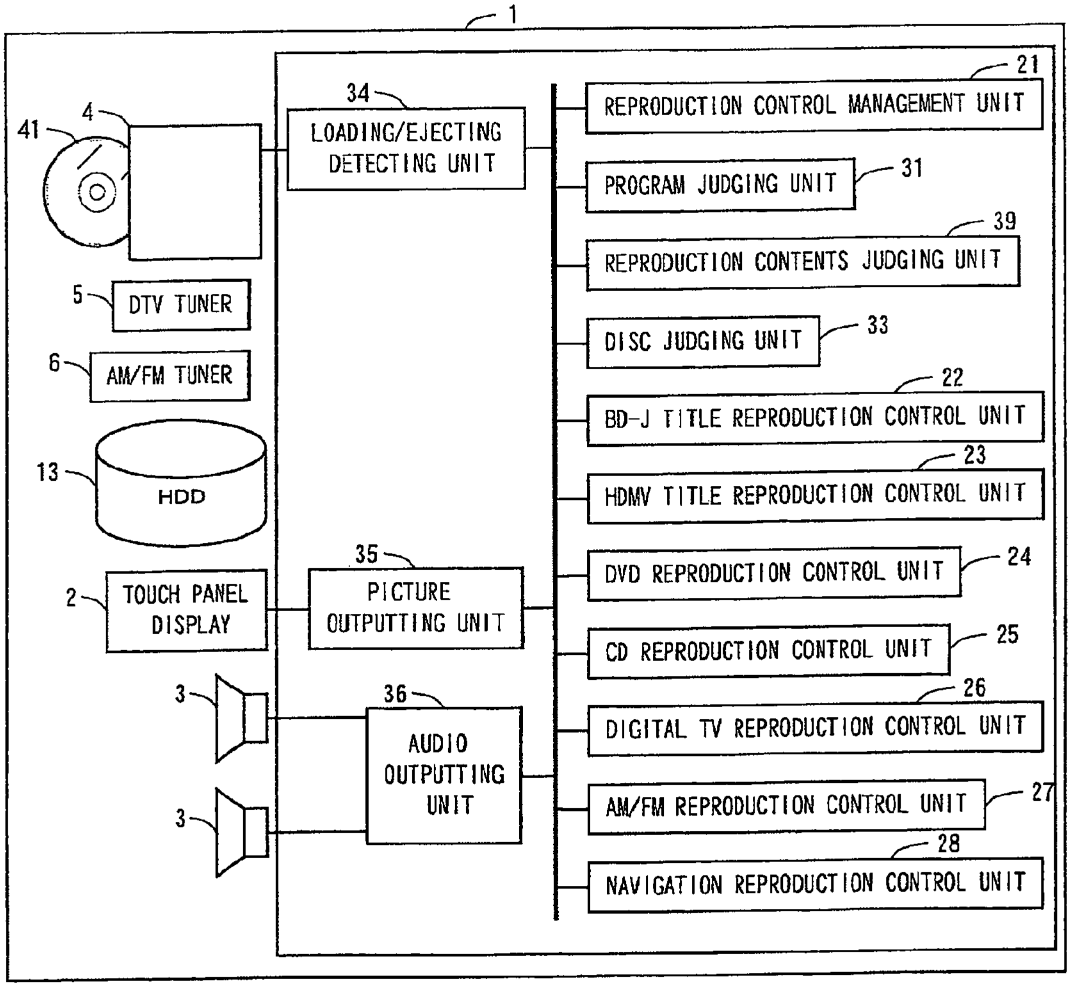
FIG. 7 is a diagram illustrating an outline of a functional configuration of a content reproducing system according to a further embodiment.

FIG. 7 is a diagram illustrating an outline of a functional configuration of the content reproducing system 1 according to the embodiment. The system according to the embodiment functions as the content reproducing system 1 including: each of reproduction control units (BD-J title reproduction control unit 22, HDMV title reproduction control unit 23, DVD reproduction control unit 24, CD reproduction control unit 25, digital TV reproduction control unit 26, AM/FM reproduction control unit 27, and navigation reproduction control unit 28) that controls the reproduction of at least one of the picture and the audio based on the data acquired from the medium by using the control scheme corresponding to the medium by the CPU 11 interpreting and executing a content reproducing program developed in the RAM 12 or the ROM 14; a loading/ejecting detecting unit 34 that detects that the load operation or the eject operation for the BD 41 has been performed with respect to the multi drive 4; a reproduction control management unit 21 that manages starting, stopping, and the like of each of the reproduction control units; a program judging unit 31 that judges whether or not a BD-J program that is being executed by the BD-J title reproduction control unit 22 is a program to be continuously executed even after the ejecting of the BD 41; a picture outputting unit 35 that performs an output of the picture signal generated by each of the reproduction control units; an audio outputting unit 36 that performs an output of the audio signal generated by each of the reproduction control units; a reproduction contents judging unit 39 that judges which of the picture and the audio is included in the content reproduced by each of the reproduction control units; and a disc judging unit 33 that judges whether or not the disc loaded on the multi drive 4 is the subsequent BD 41.

Note that the HDMV title reproduction control unit 23, the DVD reproduction control unit 24, the CD reproduction control unit 25, the digital TV reproduction control unit 26, the AM/FM reproduction control unit 27, and the navigation reproduction control unit 28 among the respective reproduction control units correspond to the first reproduction control unit of the present invention, and the BD-J title reproduction control unit 22 corresponds to the second reproduction control unit of the present invention.

Further, of the respective functional units (including the respective reproduction control units) illustrated in FIG. 7, those denoted by the same reference numerals as those illustrated in FIG. 3 have substantially the same functions as those described in the first embodiment, and hence description thereof is omitted.

Figure 8:
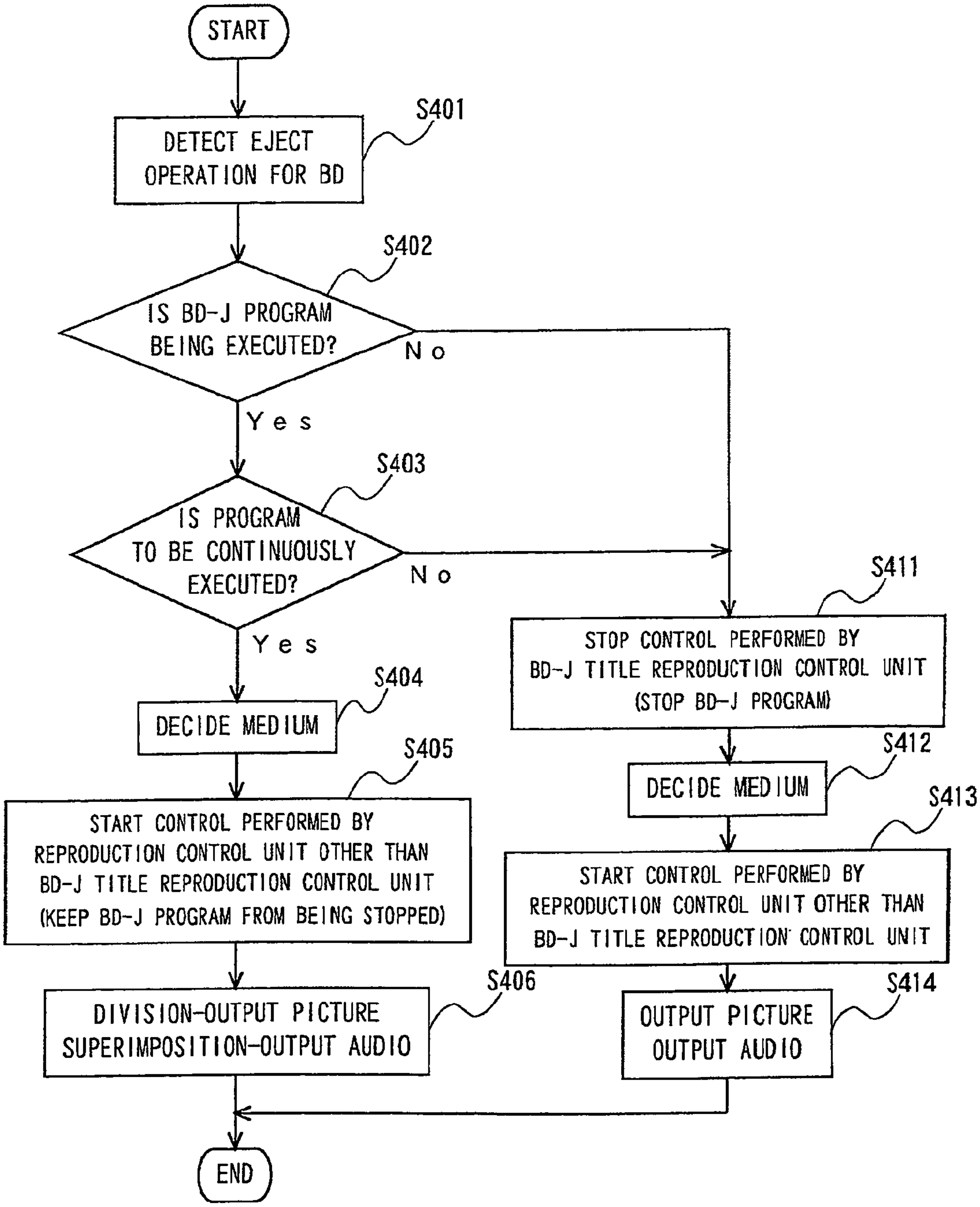
FIG. 8 is a flowchart illustrating a flow of a reproduction control processing in conjunction with disc eject according to the embodiment.

Hereinafter, a flowchart is used to describe contents of a reproduction control processing in the embodiment. FIG. 8 is a flowchart illustrating a flow of the reproduction control processing in conjunction with disc eject according to the embodiment. The processing illustrated in the flowchart is started by such a trigger that the eject operation of the BD 41 is performed during the reproduction of the content based on the BD 41 loaded on the multi drive 4. Note that a processing order of the reproduction control processing according to the present invention can be appropriately changed in combination depending upon the embodiment, and the processing order is not limited to the following example.

In Step S401, the eject operation for the BD 41 is detected. The loading/ejecting detecting unit 34 detects that the eject operation for the disc by the user via the touch panel display or various buttons is performed with respect to the multi drive 4, or that the eject operation has been performed on the multi drive 4 followed by the ejecting of the disc. After that, the processing advances to Step S402.

It is judged in Step S402 whether or not the reproduction control, which is being performed at a time point of the eject operation, is the reproduction control by the BD-J title reproduction control unit 22. At a time point when the eject operation for the BD 41 is detected in Step S401, the reproduction control management unit 21 judges whether or not the BD-J program related to the ejected BD 41 is being executed, in other words, whether or not a title that has been reproduced is a BD-J content. If it is judged that the title that has been reproduced is the BD-J title and is being controlled by the BD-J program, the processing advances to Step S403. If it is judged that the title that has been reproduced is not the BD-J title and that the BD-J program is not being executed (in other words, the reproduced title is the HDMV title or the like), the processing advances to Step S411.

In Step S403, it is judged whether or not the BD-J program being executed by the BD-J title reproduction control unit 22 is a continuing program to be continuously executed even after the ejecting of the BD 41 on which the program is recorded. If it is judged in Step S402 that the BD-J program is being executed, the program judging unit 31 judges whether or not the BD-J program being executed is a program intended to be continuously executed even after the ejecting of the disc. The BD-J program intended to be continuously executed includes information indicating that the program is to be continuously executed even after the disc ejecting, and hence the program judging unit 31 can judge whether or not the BD-J program being executed is a continuing program by referencing the contents of the BD-J program being executed. If it is judged that the BD-J program intended to be continuously executed is being executed, the processing advances to Step S404. If it is judged that the BD-J program is being executed but is not a continuing program, the processing advances to Step S411.

In Steps S404 to S406, the control of the content reproduction from a medium other than the ejected BD 41 as a source is started, and the output of the picture and the audio based on the medium other than the BD 41 is performed. From among the media excluding the BD, in other words, digital TV broadcast, radio broadcast, an HDD on which a navigation-purpose program is recorded, and the like, the reproduction control management unit 21 decides a medium for which the reproduction in conjunction with the eject operation for the BD 41 is to be started and a reproduction control unit therefor (Step S404), and causes the reproduction control unit related to the decided medium to start the reproduction control (Step S405). In other words, the reproduction control management unit 21 specifies any one of the reproduction control units excluding the BD-J title reproduction control unit 22, such as the digital TV reproduction control unit 26, the AM/FM reproduction control unit 27, and the navigation reproduction control unit 28, to cause the reproduction control to be started thereby. When the reproduction control is started, at least one of the picture signals and the audio signals generated based on any medium decided by the reproduction control management unit 21 are output to the touch panel display and the speaker (Step S406).

In this case, the BD-J program that has been executed since before the eject operation for the BD 41 is continuously executed. Therefore, with respect to the touch panel display and the speaker, the picture outputting unit 35 and the audio outputting unit 36 simultaneously output both the picture and the audio based on the BD-J program and the picture and the audio based on the medium for which the control of the content reproduction has been started in Step S405. Here, in order to allow the user to audiovisually enjoy the pictures and the audios that are simultaneously output, the picture outputting unit 35 and the audio outputting unit 36 according to the embodiment perform a compositing processing for pictures and a superimposing processing for audios (however, in a case where the outputting based on any one is the outputting only one of the picture signal and the audio signal, a signal not to be output does not need to be subjected to the compositing processing or the superimposing processing).

Figure 9:
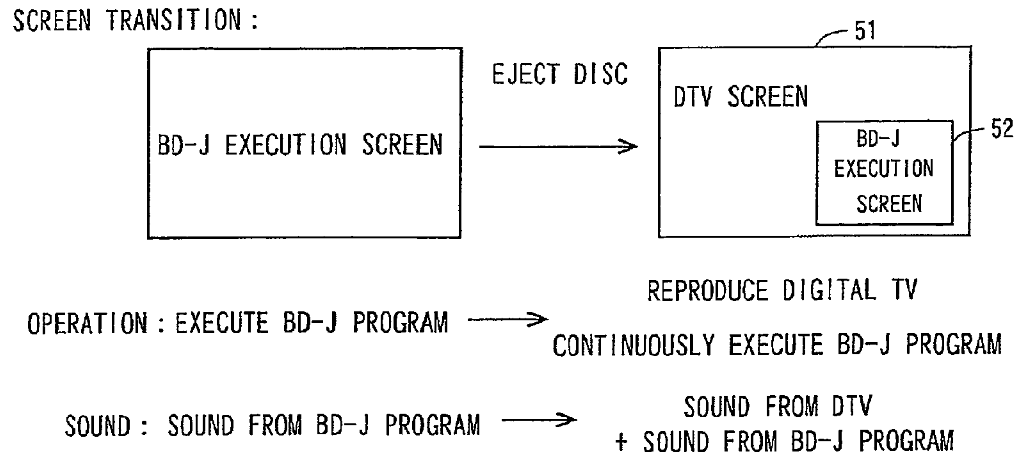
FIG. 9 is a diagram illustrating a change of display contents of a touch panel display and a change of audio contents reproduced from a speaker in a case where an eject operation for a BD is performed during execution of a BD-J program to be continuously executed in the embodiment.
Figure 10:
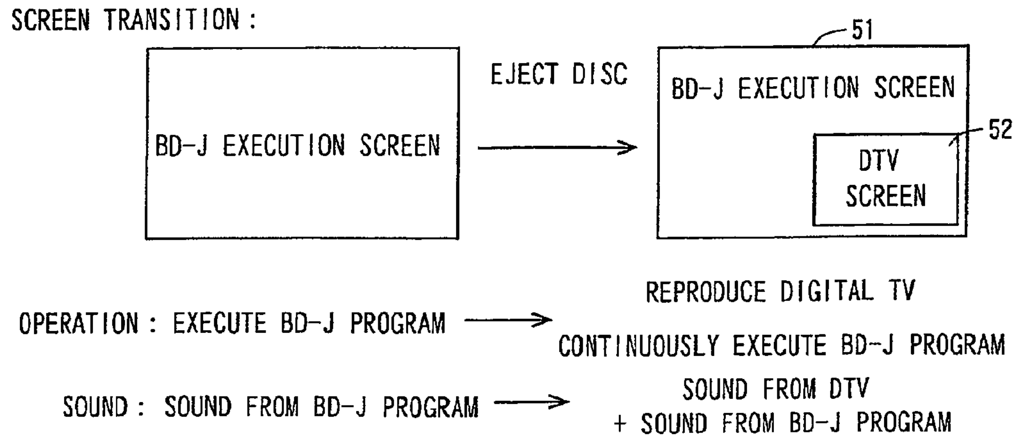
FIG. 10 is a diagram illustrating a change of the display contents of the touch panel display and a change of the audio contents reproduced from the speaker in the case where the eject operation for the BD is performed during the execution of the BD-J program to be continuously executed in the embodiment.

FIGS. 9 and 10 are diagrams each illustrating a change of display contents of the touch panel display and a change of audio contents reproduced from the speaker in the case where the eject operation for the BD 41 is performed during the execution of the BD-J program to be continuously executed in the embodiment. In order to allow the user to audiovisually enjoy the picture controlled by the BD-J title reproduction control unit 22 and the picture controlled by the reproduction control unit started in conjunction with the eject operation for the BD 41 simultaneously, the picture outputting unit 35 defines a small screen, which is an area defined by dividing (partitioning) the display area, within the display area of the touch panel display, and sets the area excluding the small area and the small area as a first display area 51 and a second display area 52, respectively. Then, the picture outputting unit 35 generates such picture signals to be finally output that the respective pictures subjected to the reproduction control by the BD-J title reproduction control unit 22 and the reproduction control unit started in conjunction with the eject operation are displayed in the first display area 51 and the second display area 52, and outputs the picture signals to the touch panel display, to thereby allow the user to audiovisually enjoy the pictures based on the respective picture signals simultaneously.

Note that the picture by the reproduction control unit started in conjunction with the eject operation and the picture by the BD-J title reproduction control unit 22 may be displayed in the first display area 51 and the second display area 52, respectively (see FIG. 9), while the picture by the reproduction control unit started in conjunction with the eject operation and the picture by the BD-J title reproduction control unit 22 may be displayed in the second display area 52 and the first display area 51, respectively (see FIG. 10). Further, a message, an icon, or the like for notifying the user of the medium or the contents of the picture currently being displayed in the display area may be displayed in each of the display areas. For example, by displaying "BD" in the area in which the picture of the BD-J title controlled by the BD-J program being continuously executed is being displayed, and "DTV" in the area in which the picture by the digital TV reproduction control unit 26 at which the control has been started in conjunction with the eject operation is being displayed, it is possible to allow the user to grasp the situation even in a case where the display of the touch panel display becomes two-screen display in conjunction with the disc eject and to prevent the user from being confused.

Further, in order to allow the user to audiovisually enjoy the audios based on the respective audio signals subjected to the reproduction control by the reproduction control unit started in conjunction with the eject operation and the BD-J title reproduction control unit 22 simultaneously, the audio outputting unit 36 mixes the audio signals and outputs the mixed audio signals to the speaker (see FIGS. 9 and 10). Accordingly, the audios based on the respective audio signals are output in a superimposed manner from the speaker, which makes it possible for the user to audiovisually enjoy the respective audios simultaneously. In this case, the balance between the volume of the audio by the reproduction control unit started in conjunction with the eject operation and the volume of the audio by the BD-J title reproduction control unit 22 may not necessarily be one to one. It is preferable that the respective volumes be automatically adjusted according to the contents of the content being reproduced, characteristics (such as a balance on a frequency band basis) of the audios being reproduced, and the like. For example, in a case where the reproduction control unit started after the eject operation is the navigation reproduction control unit 28, in order to reliably convey a navigation sound to a driver, the audio outputting unit 36 may automatically perform such adjustment that the volume of the navigation sound is larger than the volume of the audio by the BD-J title reproduction control unit 22.

Further, the audio outputting unit 36 may allow the user to audiovisually enjoy the respective audios simultaneously by outputting the audios by the different reproduction control units to different speakers instead of outputting the superimposed audios based on the mixed audio signals. In a case where a plurality of speakers are connected to the content reproducing system 1, by setting the speakers of output destinations according to the reproduction control unit controlling the audios to be output, the audio outputting unit 36 can reproduce, for a plurality of users, audios wished by the respective users. For example, the speaker at back seats can be caused to reproduce the audio by the BD-J title reproduction control unit 22 to thereby allow the audiovisual enjoying thereof for the user at the back seats, while the speaker at the driver's seat can be caused to reproduce the audio by the navigation reproduction control unit 28 to thereby allow the audiovisual enjoying thereof for the driver. Note that also in this case, the audio outputting unit 36 can automatically adjust the volume for each of the speakers of the output destinations.

If it is judged in Step S402 that the BD-J program is not being executed, or if it is judged in Step S403 that the BD-J program is being executed but is not a continuing program, the processing advances to Step S411. In Steps S411 to S414, the execution of the BD-J program is stopped, and the reproduction of the picture and the audio based on the medium other than the BD 41 is performed. The reproduction control management unit 21 stops the execution of the BD-J program performed by the BD-J title reproduction control unit 22 to thereby stop the reproduction control for the picture and the audio performed by the BD-J title reproduction control unit 22 (Step S411). Further, from among the media excluding the BD, the reproduction control management unit 21 decides a medium to be controlled by the reproduction control unit other than the BD-J title reproduction control unit 22 and the reproduction control unit therefor (Step S412), and causes the reproduction control unit related to the decided medium to start the reproduction control (Step S413). When the reproduction control is started, at least one of the picture signals and the audio signals controlled by the reproduction control unit started in Step S413 are output to the touch panel display and the speaker (Step S414).

In other words, in Steps S411 to S414, the same processing as the mode switching processing conventionally performed particularly on the on-vehicle machine or the like, in which a disc reproduction function is stopped and the reproduction based on another medium is started in conjunction with the ejecting of the disc, is performed. Therefore, if the title that has been reproduced on the ejected BD is not the BD-J title, or if the BD-J program being executed is not a program to be continuously executed, the user can be provided with a conventionally-familiar mode switching function in conjunction with a disc eject operation.

Note that when the medium for which the reproduction is to be started (and the reproduction control unit at which the control therefor is to be started) is decided in conjunction with the eject operation for the BD 41 in Step S404 described above, the reproduction control management unit 21 may decide a preset medium and the reproduction control unit therefor as the medium and the reproduction control unit to be started in conjunction with the eject operation, or may decide a medium reproduced last before the reproduction of the ejected BD 41 has been started and the reproduction control unit therefor (so-called last mode) as the medium and the reproduction control unit to be started in conjunction with the eject operation.

However, the reproduction control management unit 21 may judge which of only the picture and only the audio the output by a continuously-executed program is, and may select the reproduction control unit at which the control therefor is to be started in conjunction with the eject operation. Specifically, after the ejecting of the disc is detected, before the medium is decided in Step S404, the reproduction contents judging unit 39 judges which of the picture signal and the audio signal is included in the content being output by the BD-J program being executed.

Figure 11:
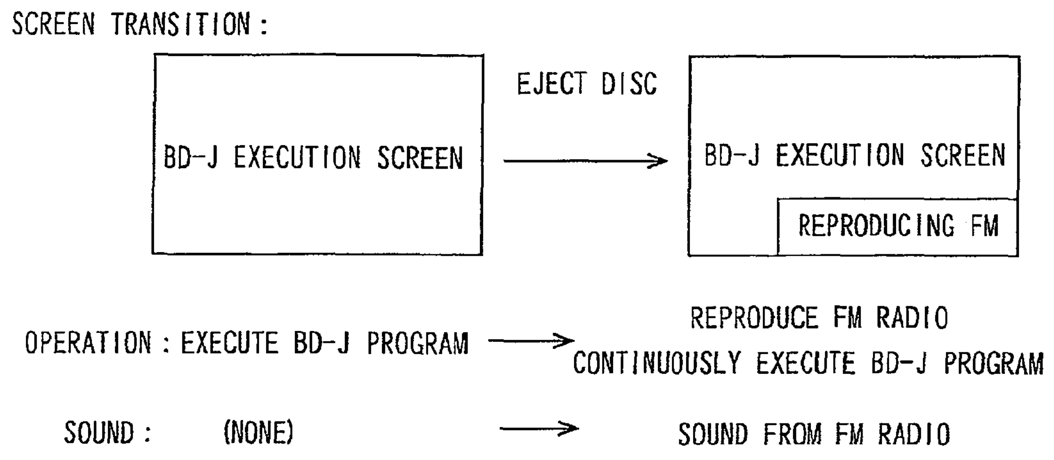
FIG. 11 is a diagram illustrating contents of a state transition in a case where a signal being output by the BD-J program being executed when the eject operation for the BD is performed is only a picture signal without an audio signal being output in the embodiment.
Figure 12:
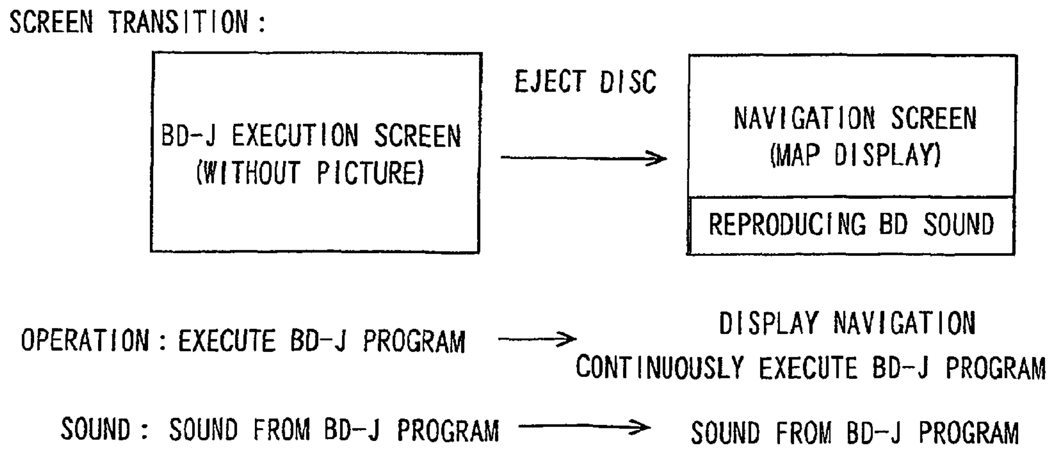
FIG. 12 is a diagram illustrating contents of the state transition in a case where the signal being output by the BD-J program being executed when the eject operation for the BD is performed is only the audio signal without the picture signal being output in the embodiment.

FIG. 11 is a diagram illustrating contents of a state transition in a case where the signal being output by the BD-J program being executed when the eject operation for the BD 41 is performed is only the picture signal without an audio signal being output in the embodiment. In other words, if it is judged by the reproduction contents judging unit 39 that the signal being output by the BD-J program being executed is only the picture signal and does not include an audio signal, the reproduction control management unit 21 selects the medium for outputting only the audio signal (AM/FM broadcast wave in the example illustrated in the drawing) and the reproduction control unit therefor (AM/FM reproduction control unit 27 in the example illustrated in the drawing), and causes the reproduction control to be started. Further, FIG. 12 is a diagram illustrating contents of a state transition in a case where the signal being output by the BD-J program being executed when the eject operation for the BD 41 is performed is only the audio signal without a picture signal being output in the embodiment. In other words, if it is judged by the reproduction contents judging unit 39 that the signal being output by the BD-J program being executed is only the audio signal and does not include a picture signal, the reproduction control management unit 21 selects the medium for outputting only the picture signal (HDD 13 on which data used for a navigation function is recorded in the example illustrated in the drawing) and the reproduction control unit therefor (navigation reproduction control unit 28 in the example illustrated in the drawing), and causes the reproduction control to be started.

Note that which of the picture and the audio is to be reproduced in the reproduction control performed by the BD-J program is judged by the BD-J program judging whether or not there has been an output with respect to the picture outputting unit 35 or the audio outputting unit 36 before the judging performed by the reproduction contents judging unit 39. More specifically, the judgment can be performed based on whether or not the BD-J program includes calling an application program interface (API) for outputting a picture or an API for performing outputting of an audio.

Accordingly, by selecting the reproduction control unit whose output contents do not overlap with those of the BD-J program to be continuously executed even after the eject, as the reproduction control unit started in conjunction with the ejecting of the BD 41, it becomes possible in the embodiment to simultaneously perform the reproduction based on a plurality of media without creating confusion for the user. Note that, in order to make it easy for the user to grasp the situation, a message, an icon, or the like for notifying the user of a name and contents of the medium from which only an audio is output may be displayed on the touch panel display 2. For example, if the BD-J program for outputting only a picture and the AM/FM reproduction control unit 27 are performing the output simultaneously, a message such as "Reproducing FM" may be displayed on the touch panel display (see FIG. 11), and if the BD-J program for outputting only an audio and the navigation reproduction control unit 28 are performing the output simultaneously, a message such as "Reproducing BD sound" may be displayed on the touch panel display (see FIG. 12).

Figure 13:
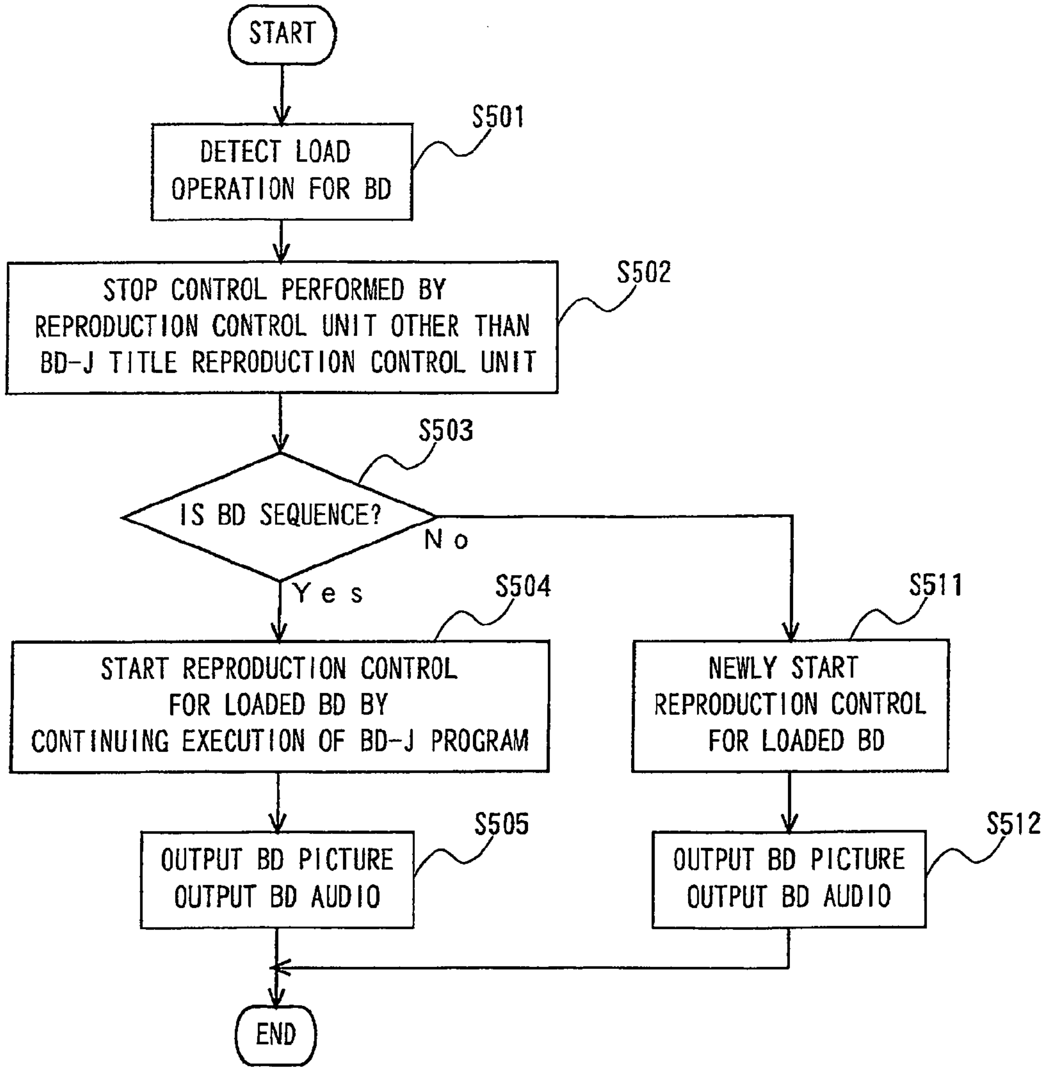
FIG. 13 is a flowchart illustrating a flow of the reproduction control processing performed in a case where the BD is loaded onto a multi drive in a state in which the BD-J program is continuously executed after the BD is taken out and also in which a picture and an audio based on another medium are being reproduced in the embodiment.

FIG. 13 is a diagram illustrating a flow of the reproduction control processing performed in a case where the BD 41 is loaded onto the multi drive 4 in a state in which the BD-J is continuously executed after the BD 41 is taken out and also in which the picture and the audio based on another medium are being reproduced (in other words, the state of Step S406 of FIG. 8) in the embodiment. Note that the processing order of the reproduction control processing according to the present invention can be appropriately changed in combination depending upon the embodiment, and the processing order is not limited to the following example.

In Step S501, the load operation for the BD 41 is detected. The loading/ejecting detecting unit 34 detects that the load operation for the disc by the user has been performed with respect to the multi drive 4, or that the load operation has been performed on the multi drive 4 followed by the loading of the disc. Specifically, the multi drive 4 according to the embodiment is a drive that employs a slot loading mechanism, and hence it is detected that a disc has been inserted into the slot of the multi drive by the user and that the BD 41 has been pulled into the drive and loaded by the slot loading mechanism. After that, the processing advances to Step S502.

In Step S502, the reproduction control performed by the reproduction control unit started in conjunction with the eject operation is stopped. At a time point when the load operation is detected in Step S501, the reproduction control unit started in conjunction with the eject operation performs the reproduction control for the picture and the audio based on the medium decided in Step S404 of FIG. 8 to thereby provide the user with functions of digital television, radio, navigation, and the like, but the reproduction control management unit 21 stops the control performed by the reproduction control unit started in conjunction with the eject operation to thereby stop the reproduction started in conjunction with the ejecting of the BD 41 in Step S405.

In this case, in a case where the display area in which the picture is displayed has been divided on the touch panel display, the picture outputting unit 35 terminates division output for the picture in response to the stopping of the reproduction control performed by the reproduction control unit started in conjunction with the eject operation, and returns to full-screen display using an entire display area on the touch panel display. Further, in a case where the superimposition of audios or the selection of an output-destination speaker is being performed by the audio outputting unit 36, the audio outputting unit 36 terminates the audio superimposing processing or the output-destination selecting processing, and returns to the normal output of a single audio. Accordingly, the user can recognize that the reproduction control performed by the two reproduction control units is terminated and the reproduction based on the newly-loaded BD 41 is started. After that, the processing advances to Step S503.

In Step S503, it is judged whether or not the loaded BD 41 is a disc corresponding to a sequence to the BD 41 related to the BD-J program being continuously executed. The disc judging unit 33 reads the information for identifying the disc from the BD 41 related to the loading detection in Step S501, and compares the information with information indicating the subsequent disc which is indicated by the BD-J program being executed to thereby judge whether or not the loaded BD 41 is the subsequent disc for the BD 41 for which the eject operation has been detected in Step S401 of FIG. 8. In the case of the match in the identification information or other such case where the loaded disc has been judged as the subsequent disc, the processing advances to Step S504. If it is judged that the loaded disc is a disc other than the subsequent disc, the processing advances to Step S511.

In Steps S504 and S505, the reproduction control for the picture and the audio using the data read from the newly-loaded BD is started by the BD-J program being continuously executed, and the picture and the audio related to the loaded BD are reproduced. By successively execute the BD-J program being continuously executed, the BD-J title reproduction control unit 22 acquires the data read from the BD 41 for which the loading has been detected in Step S501, and controls the reproduction of the picture and the audio based on the data (Step S504). More specifically, the BD-J title reproduction control unit 22 reproduces a playlist recorded on the BD 41 according to a reproduction procedure controlled by the BD-J program. Then, the picture outputting unit 35 and the audio outputting unit 36 perform the reproduction of the content by outputting at least one of the picture signals and the audio signals subjected to the reproduction control by the BD-J title reproduction control unit 22 executing the continuing program to the touch panel display and the speaker (Step S505). After that, the processing illustrated by the flowchart is brought to an end.

In Steps S511 and S512, the reproduction of the content based on the newly-loaded Bb 41 is started. According to the title control scheme recorded on the loaded BD 41, the reproduction control management unit 21 causes the BD-J title reproduction control unit 22 or the HDMV title reproduction control unit 23 to start the reproduction processing based on the loaded BD 41 (Step S511). In other words, if the title to be reproduced first on the newly-loaded BD 41 is the BD-J title, the BD-J title reproduction control unit 22 executes the BD-J program read from the newly-loaded BD 41 to thereby start the reproduction control, while if the title to be reproduced first is the HDMV title, the HDMV title reproduction control unit 23 acquires a Navigation Command to start the reproduction control for the newly-loaded BD 41. Here, if the title to be reproduced first on the loaded BD 41 is the BD-J title, and if the BD-J title reproduction control unit 22 cannot execute a plurality of BD-J programs, the execution of the continuously-executed program being continuously executed even in Step S405 and the subsequent steps may be terminated. Then, the picture outputting unit 35 and the audio outputting unit 36 perform the reproduction of the content by outputting at least one of the picture signals and the audio signals subjected to the reproduction control by the BD-J title reproduction control unit 22 or the HDMV title reproduction control unit 23 to the touch panel display and the speaker (Step S512). After that, the processing illustrated by the flowchart is brought to an end.

According to the embodiment, it becomes possible to provide the content reproducing system 1, in which the BD-J program read from the BD 41 is used to control the reproduction of the picture and the audio, with the behavior in accordance with the intention of the producer of the content contained in the BD 41 without creating confusion for the user familiar with the mode management technique for the conventional reproduction apparatus even if the BD 41 is ejected during the execution of the BD-J program.

What is claimed is:

1. A control apparatus for a content reproducing system that performs reproduction of a content based on data acquired from at least one of a plurality of kinds of medium, the control apparatus being connected to a reading device that is capable of loading and ejecting a recording medium on which a program for controlling the reproduction of the content is recorded and reads data from the loaded recording medium, the control apparatus comprising:

an eject operation detecting unit configured to detect that an eject operation for the recording medium from the reading device is performed during reproduction control in which the reproduction of the content is controlled by executing the program read from the recording medium by the reading device;

a program judging unit configured to judge, if the eject operation is detected by the eject operation detecting unit, whether or not the program being executed is a continuing program to be continuously executed even after the ejecting of the recording medium; and a reproduction control switching unit configured to perform, if it is judged that the program is not the continuing program, switching of the reproduction control by stopping the reproduction control performed by execution of the program and by starting the reproduction control for the content based on the data acquired from any medium among the plurality of kinds of medium excluding the recording medium, wherein if it is judged that the program is the continuing program, the reproduction control performed by execution of the continuing program is continued.

2. A control apparatus according to claim 1, which is further connected to a storage device that retains setting contents set in advance, the control apparatus further comprising a setting contents acquiring unit configured to acquire, from the storage device, the setting contents specifying whether or not to continue the execution of the continuing program in a case where the recording medium is ejected, wherein the reproduction control switching unit further performs the switching of the reproduction control even if it is judged that the program is the continuing program but if a setting specifying that the execution of the continuing program is not to be continued is acquired by the setting contents acquiring unit.

3. A control apparatus according to claim 1, further comprising an input receiving unit configured to receive an input of a selection of a user, which specifies whether or not to continue the execution of the continuing program in a case where the recording medium is ejected, wherein the reproduction control switching unit further performs the switching of the reproduction control even if it is judged that the program is the continuing program but if an input specifying that the execution of the continuing program is not to be continued is received by the input receiving unit.

4. A control apparatus according to claim 1, wherein the program is a content control program for controlling the reproduction of the content recorded on the recording medium along with the program and read by the reading device.

5. A control method for a content reproducing system that performs reproduction of a content based on data acquired from at least one of a plurality of kinds of medium, executed by a content reproducing apparatus connected to a reading device that is capable of loading and ejecting a recording medium on which a program for controlling the reproduction of the content is recorded and reads data from the loaded recording medium, comprising:

detecting an eject operation for the recording medium from the reading device is performed during reproduction control in which the reproduction of the content is controlled by executing the program read from the recording medium by the reading device;

judging, if the eject operation is detected in the eject operation detecting, whether or not the program being executed is a continuing program to be continuously executed even after the ejecting of the recording medium; and performing, if it is judged that the program is not the continuing program, switching of the reproduction control by stopping the reproduction control performed by execution of the program and by starting the reproduction control for the content based on the data acquired from any medium among the plurality of kinds of medium excluding the recording medium, wherein if it is judged that the program is the continuing program, the reproduction control performed by execution of the continuing program is continued.

6. A control apparatus for a content reproducing system that performs reproduction of a content based on data acquired from at least one of a plurality of kinds of medium, the control apparatus being connected to a reading device that is capable of loading and ejecting a recording medium on which a program for controlling the reproduction of the content is recorded and reads data from the loaded recording medium, the control apparatus comprising:

a first reproduction control unit configured to control the reproduction of the content based on data acquired from any medium among the plurality of kinds of medium excluding the recording medium;

a second reproduction control unit configured to control the reproduction of the content by executing the program read from the recording medium by the reading device;

an eject operation detecting unit configured to detect that an eject operation for the recording medium from the reading device is performed during reproduction control performed by the second reproduction control unit;

a program judging unit configured to judge, if the eject operation is detected by the eject operation detecting unit, whether or not the program being executed is a continuing program to be continuously executed even after the ejecting of the recording medium; and a reproduction control switching unit configured to perform, if it is judged that the program is not the continuing program, switching of the reproduction control by stopping the reproduction control performed by the second reproduction control unit and by starting the reproduction control performed by the first reproduction control unit, wherein if it is judged that the program is the continuing program, the reproduction control performed by the second reproduction control unit executing the continuing program is continued.

* * * * *